United States Patent
Horn et al.

(10) Patent No.: US 12,532,189 B2
(45) Date of Patent: Jan. 20, 2026

(54) NETWORK ASSISTED REPEATER BEAM CONFIGURATIONS

(71) Applicant: QUALCOMM Incorporated, San Diego, CA (US)

(72) Inventors: Idan Michael Horn, Hod Hasharon (IL); Shay Landis, Hod Hasharon (IL); Yehonatan Dallal, Kfar Saba (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 525 days.

(21) Appl. No.: 18/052,471

(22) Filed: Nov. 3, 2022

(65) Prior Publication Data
US 2024/0155370 A1 May 9, 2024

(51) Int. Cl.
*H04W 16/28* (2009.01)
(52) U.S. Cl.
CPC ................. *H04W 16/28* (2013.01)

(58) Field of Classification Search
CPC .................................................. H04W 16/28
See application file for complete search history.

(56) References Cited

U.S. PATENT DOCUMENTS

2024/0364414 A1\* 10/2024 Wanuga ............... H04L 5/0094

\* cited by examiner

*Primary Examiner* — Eric Myers
(74) *Attorney, Agent, or Firm* — Harrity & Harrity, LLP

(57) ABSTRACT

Wireless communications systems and methods related to beam management configurations for relay devices or repeaters are provided. A network node receives, from a relay node, a first communication indicating one or more beam management parameters associated with a plurality of beam directions. The network node receives, via the relay node, one or more second communications associated with one or more user equipments (UEs) and at least one of the plurality of beam directions. The network node transmits, to the relay node based on the one or more beam management parameters and the one or more second communications, a third communication indicating a beam management configuration associated with the plurality of beam directions.

30 Claims, 12 Drawing Sheets

NETWORK ASSISTED REPEATER BEAM CONFIGURATIONS

TECHNICAL FIELD

This application relates to wireless communication systems, and more particularly, to beam configurations for wireless repeater devices.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

While high frequency bands, such as mmWave bands, can provide a higher data throughput than lower frequency bands, the path-loss can be high. To overcome the high path-loss, BSs and UEs may use beamforming to form directional beams for communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure describes schemes, mechanisms, and devices for network controlled adaptive beam management involving one or more relay nodes. In some aspects, a method for relay node management may include the relay node transmitting an indication of its beam management configuration or parameters to a network node. Based on the indicated beam management configuration, the network node or a different network device may determine a mapping or association between synchronization signal block (SSB) instances and/or random access channel (RACH) occasions to one or more beam directions controlled by the relay node. Accordingly, the network may obtain statistics indicating the more commonly used beam directions by one or more wireless communication devices within the coverage area of the relay node based on the mapping or association. For example, if a user equipment (UE) commonly uses a first set of RACH occasions associated with a first relay beam direction or beam sub-index, the network may determine that the first relay beam direction is more commonly used than the other relay beam directions. Accordingly, the network may determine or generate an updated beam management configuration based on the obtained statistics and the indicated beam management configuration from the relay node.

The network node may transmit an indication of the updated be management configuration to the relay node. The relay node may perform beam based communications and signaling with the wireless communication devices within its coverage area based on the updated beam management configuration provided by the network. The updated beam management configuration may indicate one or more disabled or skipped beam directions and an updated SSB periodicity for the remaining enabled beam directions. In some aspects, the updated periodicity used for the remaining enabled beam directions may be lower than (more frequent than) The SSB periodicity used when all beam directions were enabled. In some aspects, the relay node may continue to transmit SSBs and/or other reference signals in the disabled or skipped beam directions with a larger periodicity than used for the enabled beams. In some aspects, the periodicity used for the disabled or skipped beam directions may be substantially larger or longer than that of the enabled beam directions. The periodicity used for the disabled or skipped beam directions may be semi-statically configured, or hard-coded at the relay node.

According to one aspect of the present disclosure, a method of wireless communication performed by a network node comprises: receiving, from a relay node, a first communication indicating one or more beam management parameters associated with a plurality of beam directions; receiving, via the relay node, one or more second communications associated with one or more user equipments (UEs) and at least one of the plurality of beam directions; and transmitting, to the relay node based on the one or more beam management parameters and the one or more second communications, a third communication indicating a beam management configuration associated with the plurality of beam directions.

According to another aspect of the present disclosure, a method of wireless communication performed by a relay node comprises: transmitting, to a network node, a first communication indicating one or more beam management parameters associated with a plurality of beam directions; transmitting, to the network node, one or more second communications associated with one or more user equipments (UEs) and one or more of the plurality of beam directions; receiving, from the network node in response to the first communication and the one or more second communications, a third communication indicating a beam management configuration associated with the plurality of beam directions; and transmitting, based on the beam management configuration, a reference signal in at least a portion of the plurality of beam directions.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1A:
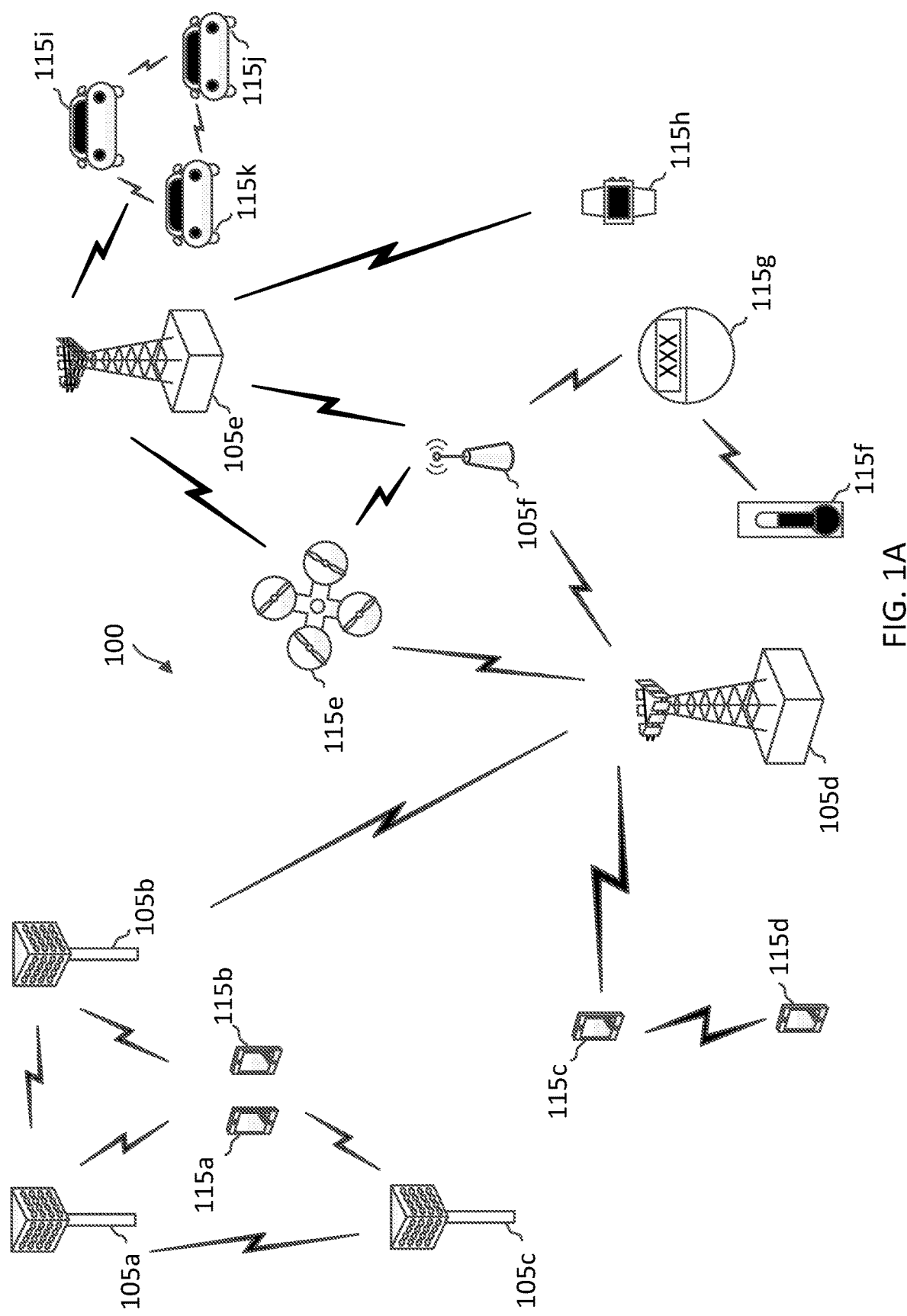
FIG. 1A illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

A wireless communication network may operate over a high frequency band, such as a mmWave band, to provision for a high data throughput. To overcome the high path-loss in the high frequency band, a base station (BS) may transmit reference signals and/or synchronization signal blocks (SSBs) in different beam directions, for example, by sweeping across a set of predefined beam directions. The BS may repeat the transmissions of the reference signals and/or SSBs in the different beam directions to allow a user equipment (UE) to perform signal measurements. The UE may report the measurements to the BS. The BS and the UE may select a best beam direction among the set of beam directions for subsequent communications. In some instances, the initially selected beam direction may not be optimal or the channel condition may change, and thus the BS and the UE may perform a beam refinement procedure to refine a beam selection. For instance, the initial selected beam may have a wide beamwidth for a broad coverage area and the beam refinement procedure may select a narrower beam in the initially selected direction. The narrower beam may cover a smaller geographical area, but may provide a higher transmission gain. The narrow beam with the higher gain can provide a higher signal-to-noise ratio (SNR) than the wide beam.

In higher frequencies, such as millimeter wave (mmWave) or sub-THz frequencies, line-of-sight (LOS) transmission may be advantageous for coverage to reduce path-loss and maintain SNR to acceptable levels. In urban and/or indoor environments, non-LOS operation at these frequencies may be impractical or otherwise undesirable. However, an LOS channel or beam may be challenging to establish and maintain. Accordingly, repeating or relaying devices may be used to relay beamformed signals within urban environments and/or within a building. For example, a smart repeater, smart relay, femto-cell, reconfiguration intelligent surface (RIS), and/or any other suitable type of relay device may be used to extend coverage within spatially complex environments. For the purpose of the present disclosure, the term "repeater" may be used to refer to any of these repeating or relaying devices.

In some instances, a repeater device may be placed on an external wall or on a window within a beam path of at least one beam direction of a base station (BS), and to repeat or relay DL/UL signals between the BS and one or more UEs within the building. It may be beneficial for the repeaters to maintain a low latency to reduce or mitigate communication delays, and in particular to prevent a delay spread that passes a cyclic prefix (CP) length. It may also be desirable that the repeater's beam coverage can cover a spatial area, such as a room or collection of rooms. It may also be desirable that the repeater support communications with multiple UEs. To address these concerns, a repeater may operate using a transparent beam management procedure (TBMP). A repeater operating based on a TBMP may perform limited digital signal processing, which may involve the repeater obtaining fewer statistics regarding the number of connected UEs, beam performance, time of day performance, etc. Thus, the repeater may be less capable of predicting UE behavior and conditions, and/or adapting to changing channel conditions, UE location, etc.

The present disclosure provides systems, devices, schemes, and mechanisms for network-assisted repeater beam selection. For example, a repeater may be in communication with the network via a BS or other network node. The repeater may be configured with a TBMP. The TBMP may include or involve a beam sweeping protocol for transmitting and/or receiving reference signals to/from one or more UEs. In some aspects, the TBMP may include beam sweeping parameters and/or configurations for SSB transmission, including number of beam directions, per-beam periodicity, and/or any other suitable parameter. According to aspects of the present disclosure, the repeater may transmit, to a network node, a communication indicating one or more of the TBMP parameters, including a number of beam directions associated with the coverage area of the repeater, a periodicity for each beam direction, and/or a signal power or signal energy for each beam direction. The network node may obtain, based on the TBMP parameters indicated by the repeater, statistics associated with the likelihood that one or more UEs can be found within a given beam direction of the plurality of beam directions. For example, the network node may be configured to associate or map, based on the TBMP parameters, each of a plurality of random access occasions to a given beam direction. The network node may transmit, to the repeater based on the statistics and the indicated TBMP parameters, a beam management configuration which may change at least one of a periodicity of one or more beam directions and/or a signal power for one or more of the beam directions. In some aspects, the beam management configuration may be an updated or revised TBMP configuration. In some aspects, the beam management configuration may indicate that one or more of the beam directions are disabled or otherwise associated with a less-frequency periodicity than at least one other beam direction.

For example, the network may determine, based on the obtained statistics and the indicated TBMP parameters, that one or more UEs are more likely to be found in a first subset of the plurality of beam directions, and far less likely to be found in a second subset of the plurality of beam directions. Accordingly, the network node may transmit the beam management configuration indicating a first periodicity for the first subset of the plurality of beam directions, and that the second subset of beam directions is disabled or idle. The first periodicity of the beam management configuration may be lower (e.g., more frequent) than the periodicity initially configured for the TBMP. Further, it will be understood that the indication of the second subset of beam directions as disabled may not cause the repeater to cease all transmissions in the second subset of beam directions. For example, the indication from the network that the second subset of beam directions is disabled may cause the repeater to use a much larger second periodicity (e.g., less frequency) for the second subset than the first periodicity. For example, the repeater may be configured with a base level periodicity for disabled beams (e.g., 1 transmission/second, 1 transmission every 2 seconds, 1 transmission every 4 seconds, etc.). Accordingly, the repeater may continue to discover or reach wireless communication devices in the event they move to an area associated with a disabled beam direction.

The aspects of the present disclosure provide several advantages. For example, aspects of the present disclosure allow for an adaptive beam management procedure using a low-latency repeater device. In this regard, a repeater device that does not decode and re-encode data may reduce delays involved with communications via the repeater device. However, it may be impractical or impossible for such low-latency repeater devices to update or modify their beam management configurations. Accordingly, the mechanisms described in the present disclosure allows for adaptive beam management for low-latency repeater devices. Further, the beam management may be transparent to the UE so that the communication protocols and configurations may not need to be modified to account for the adaptive beam management. Accordingly, the coverage of UEs within the coverage area of the repeater device may be more reliable, delays or latency may be reduced or mitigated, and user experience may be improved.

FIG. 1A illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel.

In some aspects, the network 100 may operate over a high frequency band, for example, in a frequency range 1 (FR1) band or a frequency range 2 (FR2) band. FR1 may refer to frequencies in the sub-6 GHz range and FR2 may refer to frequencies in the mmWave range. To overcome the high path-loss at high frequency, the BSs 105 and the UEs 115 may communicate with each other using directional beams. For instance, a BS 105 may transmit SSBs by sweeping across a set of predefined beam directions and may repeat the SSB transmissions at a certain time interval in the set of beam directions to allow a UE 115 to perform initial network access. In some instances, each beam and its corresponding characteristics may be identified by a beam index. For instance, each SSB may include an indication of a beam index corresponding to the beam used for the SSB transmission. The UE 115 may determine signal measurements, such as reference signal received power (RSRP) and/or reference signal received quality (RSRQ), for the SSBs at the different beam directions and select a best DL beam. The UE 115 may indicate the selection by transmitting a PRACH signal (e.g., MSG1) using PRACH resources associated with the selected beam direction. For instance, the SSB transmitted in a particular beam direction may indicate PRACH resources that may be used by a UE 115 to communicate with the BS 105 in that particular beam direction. After selecting the best DL beam, the UE 115 may complete the random access procedure (e.g., the 4-step random access or the 2-step random access) and proceed with network registration and normal operation data exchange with the BS 105. In some instances, the initially selected beams may not be optimal or the channel condition may change, and thus the BS 105 and the UE 115 may perform a beam refinement procedure to refine a beam selection. For instance, BS 105 may transmit CSI-RS s by sweeping narrower beams over a narrower angular range and the UE 115 may report the best DL beam to the BS 105. When the BS 105 uses a narrower beam for transmission, the BS 105 may apply a higher gain, and thus may provide a better performance (e.g., a higher signal-noise-ratio (SNR)).

In some aspects, the network 100 may be an IoT network and the UEs 115 may be IoT nodes, such as smart printers, monitors, gaming nodes, cameras, audio-video (AV) production equipment, industrial IoT devices, and/or the like. The transmission payload data size of an IoT node typically may be relatively small, for example, in the order of tens of bytes. In some aspects, the network 100 may be a massive IoT network serving tens of thousands of nodes (e.g., UEs 115) over a high frequency band, such as a FR1 band or a FR2 band. Mechanisms for performing beamforming and beam management in a massive IoT network or any network with a massive number of nodes (e.g., UEs 115) are described in greater detail herein.

Figure 1B:
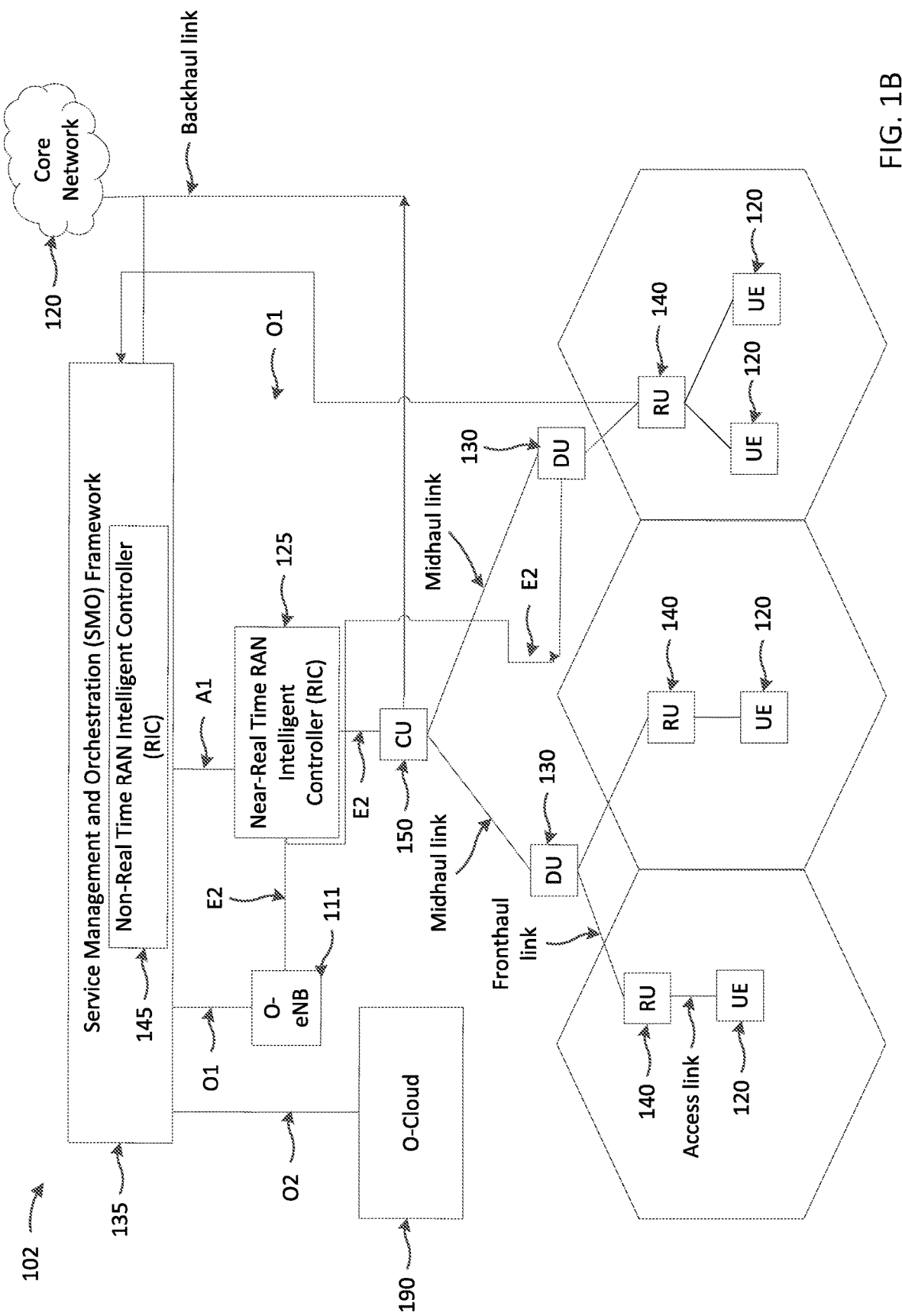
FIG. 1B illustrates an example disaggregated base station architecture according to some aspects of the present disclosure.

FIG. 1B shows a diagram illustrating an example disaggregated base station 102 architecture. The disaggregated base station 102 architecture may include one or more central units (CUs) 150 that can communicate directly with a core network 104 via a backhaul link, or indirectly with the core network 104 through one or more disaggregated base station units (such as a Near-Real Time (Near-RT) RAN Intelligent Controller (RIC) 125 via an E2 link, or a Non-Real Time (Non-RT) RIC 145 associated with a Service Management and Orchestration (SMO) Framework 135, or both). A CU 150 may communicate with one or more distributed units (DUs) 130 via respective midhaul links, such as an F1 interface. The DUs 130 may communicate with one or more radio units (RUs) 140 via respective fronthaul links. The RUs 140 may communicate with respective UEs 120 via one or more radio frequency (RF) access links. In some implementations, the UE 120 may be simultaneously served by multiple RUs 140.

Each of the units, i.e., the CUs 150, the DUs 130, the RUs 140, as well as the Near-RT RICs 125, the Non-RT RICs 145 and the SMO Framework 135, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 150 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 150. The CU 150 may be configured to handle user plane functionality (i.e., Central Unit-User Plane (CU-UP)), control plane functionality (i.e., Central Unit-Control Plane (CU-CP)), or a combination thereof. In some implementations, the CU 150 can be logically split into one or more CU-UP units and one or more CU-CP units. The CU-UP unit can communicate bidirectionally with the CU-CP unit via an interface, such as the E1 interface when implemented in an O-RAN configuration. The CU 150 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 130 may further host one or more low PHY layers. Each layer (or module) can be implemented with an interface configured to communicate signals with other layers (and modules) hosted by the DU 130, or with the control functions hosted by the CU 150.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs. In some implementations, real-time and non-real-time aspects of control and user plane communication with the RU(s) 140 can be controlled by the corresponding DU 130. In some scenarios, this configuration can enable the DU(s) 130 and the CU 150 to be implemented in a cloud-based RAN architecture, such as a vRAN architecture.

The SMO Framework 135 may be configured to support RAN deployment and provisioning of non-virtualized and virtualized network elements. For non-virtualized network elements, the SMO Framework 135 may be configured to support the deployment of dedicated physical resources for RAN coverage requirements which may be managed via an operations and maintenance interface (such as an O1 interface). For virtualized network elements, the SMO Framework 135 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 150, DUs 130, RUs 140 and Near-RT RICs 125. In some implementations, the SMO Framework 135 can communicate with a hardware aspect of a 4G RAN, such as an open eNB (O-eNB) 111, via an O1 interface. Additionally, in some implementations, the SMO Framework 135 can communicate directly with one or more RUs 140 via an O1 interface. The SMO Framework 135 also may include a Non-RT RIC 145 configured to support functionality of the SMO Framework 135.

The Non-RT RIC 145 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 125. The Non-RT RIC 145 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 150, one or more DUs 130, or both, as well as an O-eNB, with the Near-RT RIC 125.

In some implementations, to generate AI/ML models to be deployed in the Near-RT RIC 125, the Non-RT RIC 145 may receive parameters or external enrichment information from external servers. Such information may be utilized by the Near-RT RIC 125 and may be received at the SMO Framework 135 or the Non-RT RIC 145 from non-network data sources or from network functions. In some examples, the Non-RT RIC 145 or the Near-RT RIC 125 may be configured to tune RAN behavior or performance. For example, the Non-RT RIC 145 may monitor long-term trends and patterns for performance and employ AI/ML models to perform corrective actions through the SMO Framework 135 (such as reconfiguration via 01) or via creation of RAN management policies (such as A1 policies).

Figure 2:
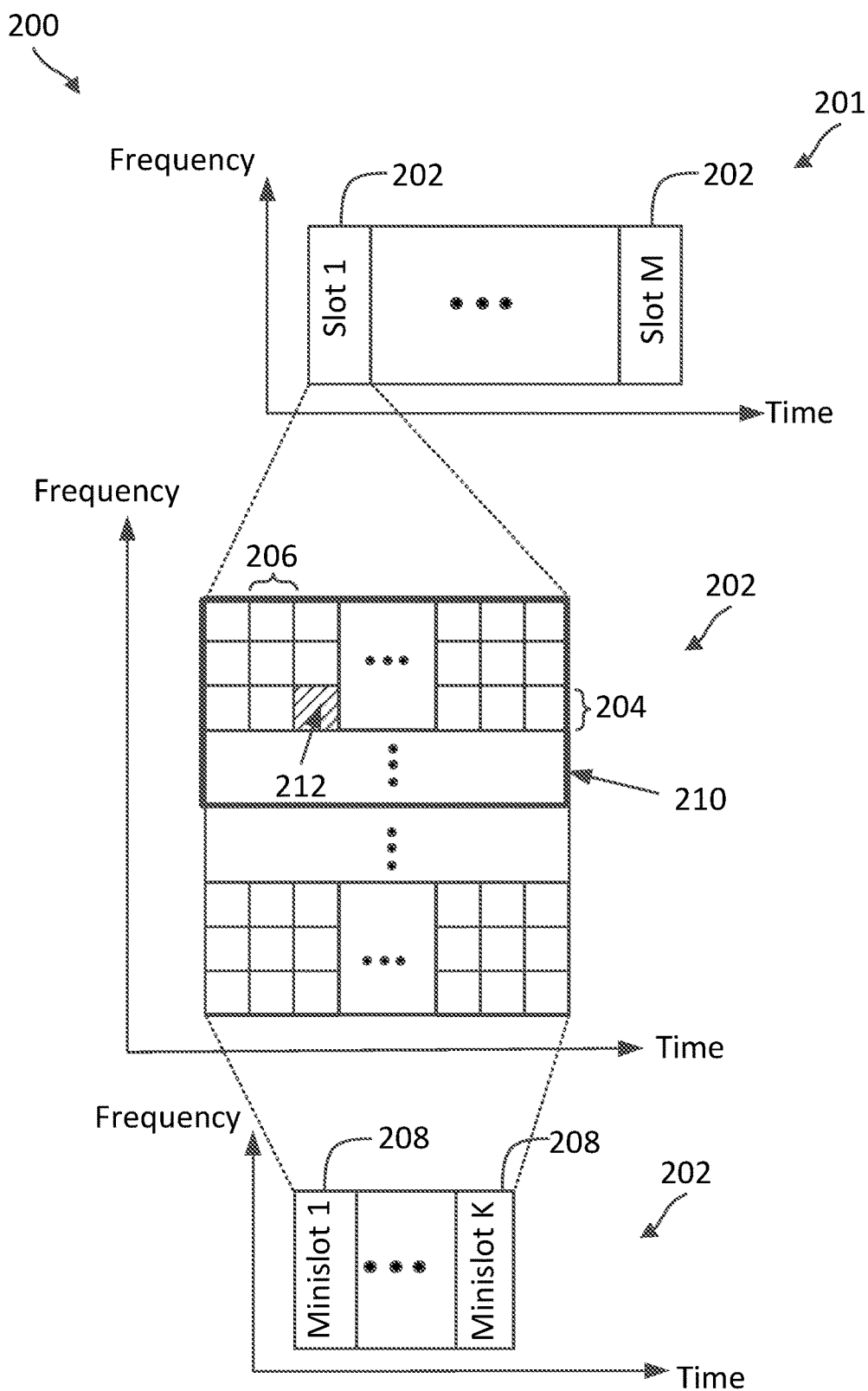
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
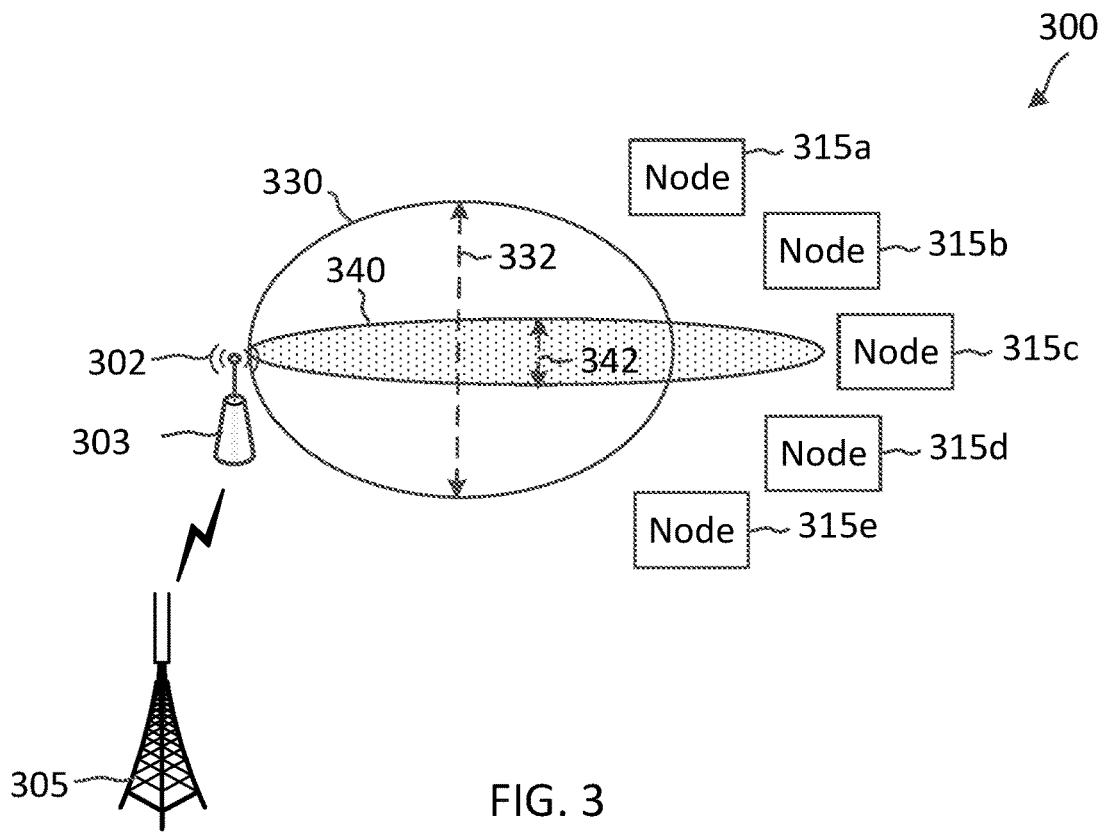
FIG. 3 illustrates a wireless communication network utilizing directional beams for communications according to some aspects of the present disclosure.

FIG. 3 illustrates a wireless communication network 300 utilizing directional beams for communications according to some aspects of the present disclosure. The network 300 may correspond to a portion of the network 100. FIG. 3 illustrates a BS 305 in communication with a repeater 303. The repeater 303 is in communication with five nodes 315 (shown as 315*a*, 315*b*, 315*c*, 315*d*, and 315*e*). For purposes of simplicity of discussion, though it will be recognized that aspects of the present disclosure may scale to more BSs 305, repeaters 303, and more or less nodes 315. The BS 305 may correspond to a BS 105 of the network 100 and the nodes 315 may correspond to UEs 115 of the network 100. The repeater 303 may be a smart repeater device, a reconfigurable intelligent surface (RIS), a relay device, and/or any other suitable wireless communication device configured to repeat and/or relay communications between the BS 305 and the wireless nodes 315. The nodes 315 may be smartphone devices and/or mobile computing devices, in some aspects. In other aspects, the nodes 315 may be IoT nodes, such as smart printers, smart meters, monitors, gaming nodes, cameras, AV production equipment, industrial IoT devices, sensors, vehicles, and/or the like. The nodes 315 may collect data, measurements, statuses and report the data, measurements, and/or statuses to the BS 305 via the Repeater 303. In some other instances, the nodes 315 may be CPEs. The repeater 303 and the nodes 315 may communicate with each other over a sub-6 GHz band or a mmWave band using directional beams. In some instances, the repeater 303 and/or the nodes 315 may use a small antenna array with a few number of antenna elements for beamforming for communication over a sub-6 GHz band, and may use a large number of antenna elements for beamforming for communication over a mmWave band. Additionally, the repeater 303 and the nodes 315 may communicate with each other using the radio frame structure 200. Further, given the large bandwidth available at the high-frequency band, the repeater 303 may communicate with the nodes 315 using frequency-division-multiplexing (FDM) instead of using time-division multiplexing (TDM).

In the illustrated example of FIG. 3, the nodes 315*a*-315*e* are located at geographical locations that are in close proximity to each other. The repeater 303 may include an antenna array 302. The antenna array 302 may include a number of antenna elements that can be configured for beamforming to create directional beams. The repeater 303 may configure the antenna array 302 to create a broad coverage beam 330 to cover as many nodes as possible. A broad coverage beam 330 refers to a beam with a wide beamwidth 332 that can cover a large geographical area. The beamwidth 332 may refer to the width of the main lobe (within 3 dB or 5 dB of the peak array gain as example illustrations) or main beam with a maximum radiated energy. For instance, the repeater 303 may utilize the wide beam 330 to communicate with all the nodes 315*a*-315*e*. Since the antenna array 302 may deliver a limited amount of gain, a wider beam may have a lower gain (e.g., a lower peak gain) than a narrower beam. Alternatively, the repeater 303 may configure the antenna array 302 to create a narrow coverage beam 340 to provide a higher gain (e.g., a higher peak gain). A narrow coverage beam 330 refers to a beam with a narrow beamwidth 342 that can cover a small geographical area. For instance, the narrow beam 340 may only cover the node 315*c*, but may provide a higher gain to the node 315*c* compared to the wide beam 330. Thus, when using narrow beams for communications, the repeater 303 may create a different narrow beam (in a different beam direction) for communication with each node 315. In other words, in order to use narrow beams for the high gain, the repeater 303 may communicate with each node 315 at a different time using different beams rather than communicating with all nodes 315*a*-315*e* at the same time using FDM with a wide beam. As such, there is a trade-off between transmission gain and beamwidth or coverage in order to take advantage of the large bandwidth.

Figure 4:
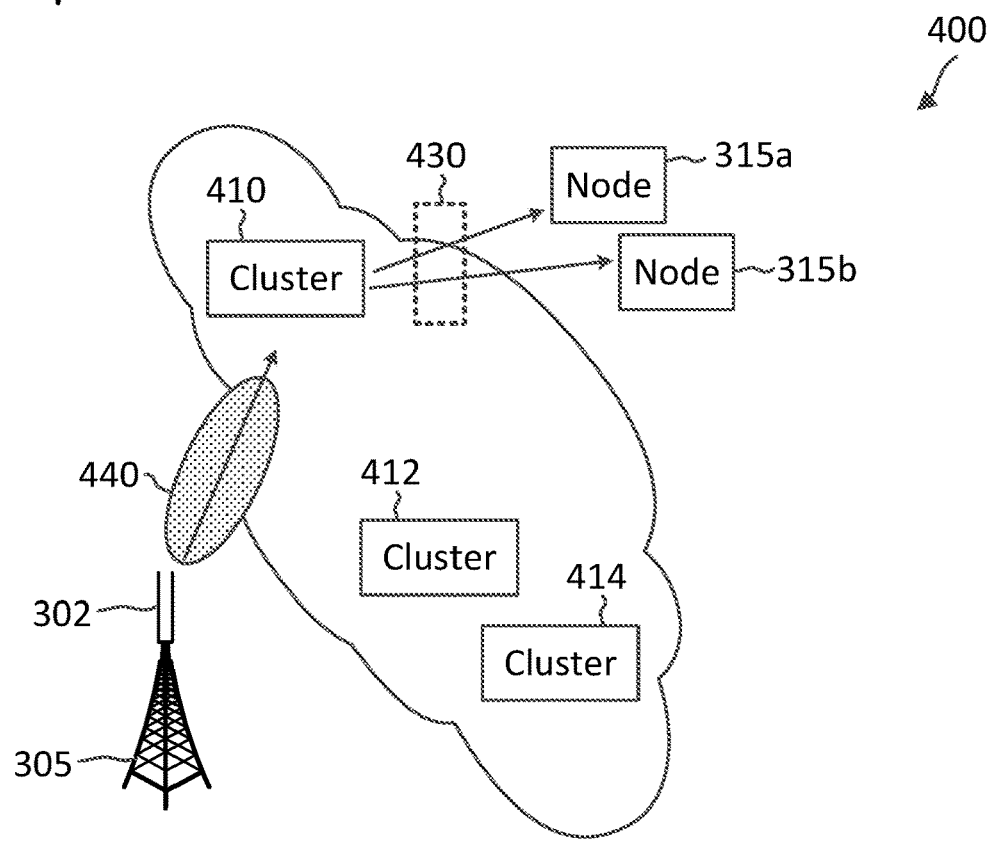
FIG. 4 illustrates a wireless communication scenario with directional beams according to some aspects of the present disclosure.

FIG. 4 illustrates a wireless communication scenario 400 with directional beams according to some aspects of the present disclosure. The scenario 400 may correspond to a communication scenario between the repeater 303 and the nodes 315a and 315b in the network 300. In the illustrated example of FIG. 4, the scenario 400 includes multiple sets of clusters 410, 412, and 414 in an environment between the repeater 303 and the nodes 315. The clusters 410, 412, 414 may include any objects which may function as reflectors, scatterers, and/or diffractors that contribute to a mmWave propagation path. Due to the close proximity of the geographical locations of the nodes 315a and 315b, the nodes 315a and 315b may experience a similar channel with the same set of dominant clusters. As shown, the clusters 410 may be a dominant set of clusters when the repeater 303 uses a beam 440 to communicate with the nodes 315a and 315b. The clusters 412 and 414 may have different channel effects for the nodes 315a and 315b, but it may have little or no impact to the channel structure when the repeater 303 uses the beam 440 for communications with the nodes 315a and 315b. In other words, the large-scale channel properties (e.g., path loss, penetration loss) experienced by the nodes 315a and 315b due to the clusters 410 may be substantially similar. It should be noted that while the repeater 303 uses the same beam 440 for communications with the nodes 315a and 315b, the channel matrix between the repeater 303 and the node 315a can be different from the channel matrix between the repeater 303 and the node 315b. If the propagation paths between the repeater 303 and the nodes 315 are blocked by a blocker 430, both nodes 315a and 315b may be blocked from communicating with the repeater 303. In other words, the channel structure between the repeater 303 and the node 315a is correlated with the channel structure between the repeater 303 and the node 315b.

Figure 5:
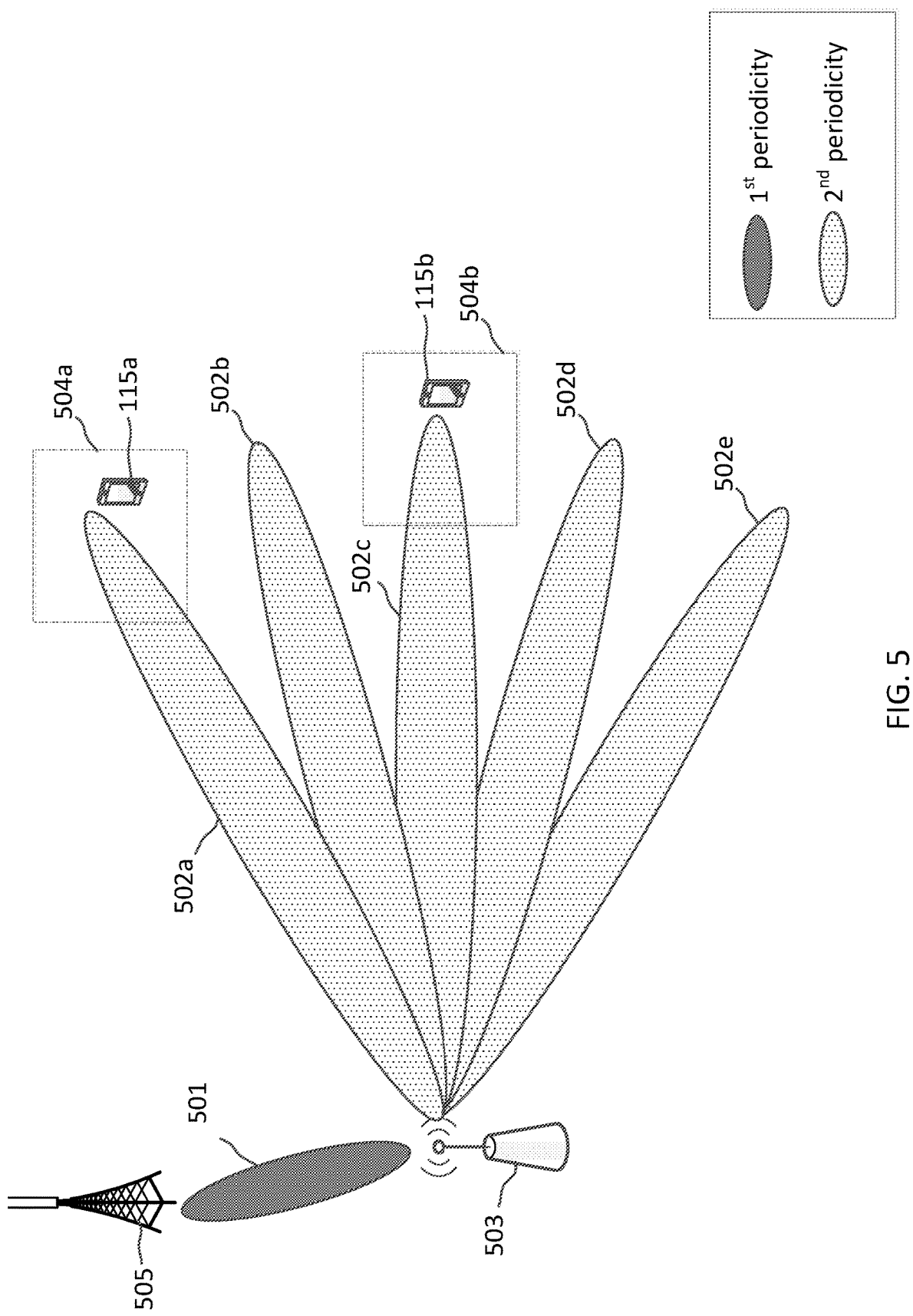
FIG. 5 illustrates a wireless communication scenario in which a network device communicates with one or more user equipments (UEs) via a relay node using a plurality of relay beam directions.

FIG. 5 illustrates a wireless communication scenario 500 in which a network node 505 communicates with one or more UEs 115 via a relay node 503. The network node 505 may be a BS, such as one of the BSs 105 in the network 100. The network node 505 may be an aggregated BS or a disaggregated BS. For example, the network node 505 may comprise a distributed unit (DU). In another example, the network node 505 may comprise a centralized unit (CU) and the relay node 503 may comprise a DU.

In some aspects, the relay node 503 may be a smart repeater, a reflective intelligent surface (RIS), a relay device, and/or any other suitable type of wireless communication device configured to repeat and/or relay communications between the network node 505 and the UEs 115. In one example, the relay node 503 comprises a smart repeater configured for transparent repeating of communication signals between the network node 505 and the UEs 115. In this regard, the relay node 503 may be configured to relay or repeat communications without decoding and re-encoding. In other aspects, the relay node 503 may be configured to decode and re-encode communications between the network node 505 and the UEs 115.

In the example of FIG. 5, the relay node 503 may communicate with the network node 505 using a first beam 501. In some aspects, the first beam 501 may be described as a spatial filter or other beam related configurations used for wirelessly transmitting and receiving communications. In some aspects, the beam 501 may be associated with a beam direction. The beam direction may be associated with a TCI state. In another aspect, the beam direction may be associated with a SSB index. In this regard, the network node 505 may be configured to transmit SSB bursts by sweeping across a coverage area in a plurality of beam directions. Based on feedback from the wireless nodes, UEs, and/or other wireless communication devices within the coverage area, the network may establish communications with each wireless communication device based on a selected beam direction. The first beam 501 may be associated with a first SSB periodicity. The first SSB periodicity may be configurable via a RRC configuration. In some aspects, the SSB periodicity may be 5 ms, 10 ms, 20 ms, 40 ms, 60 ms, 80 ms, 100 ms, 120 ms, or any other suitable periodicity.

Further, the relay node 503 may be similarly configured to use beamforming to transmit and/or receive signals within a coverage area using a plurality of different beam directions 502a-502e. For example, the relay node 503 may be configured with a transparent beam management procedure (TBMP) configuration including beamforming and/or beam sweeping parameters, including number of beams, TCI states, spatial filter information, and periodicity of each beam direction 502. In some aspects, each beam direction 502 may be associated with a sub-index. In some aspects, the beam configuration of the relay node 503 may be transparent to the UEs 115. The plurality of beam directions 502 may be associated with a second periodicity that may be different from the first periodicity. The relay node 503 may receive a SSB from the network node 505 and repeat or relay the SSB in one of the beam directions 502. For example, if the first SSB periodicity is 20 ms, the second periodicity for each of the beam directions 502 may be 100 ms if the relay node 503 is configured to transmit in five beam directions 502a-502e. In another example, if the first SSB periodicity is 10 ms, the relay node 503 may be configured to relay or repeat the SSB in each of the beam directions 502 with a periodicity of 50 ms.

Each of the beam directions 502 may correspond to a different spatial region within the coverage area of the relay node 503. For example, a first beam direction 502a occupies at least a portion of a first region 504a. A first UE 115a is located within the first region 504a. In some aspects, the first region 504a may represent a location in which the UE 115a is commonly found. For example, the first region 504a may be a working desk, a night stand, or a living room couch. A third beam direction 502c occupies at least a portion of a second region 504b. Similar to the first region 504a, the second region 504b may represent a location within the coverage area of the relay node 503 in which the second UE 115b is commonly found. For example, the second region 504b may be a night stand, a working desk, a seating area, a kitchen, a bathroom, and/or any other suitable location or combination thereof. The remaining beam directions, including a second beam direction 502b, a fourth beam direction 502d, and a fifth beam direction 502e may occupy regions within the coverage area in which the one or more UEs 115 are less likely to be found.

Accordingly, in the scenario shown in FIG. 5, the relay node 503 may transmit and/or receive in each of the beam directions 502 based on a same periodicity. However, as mentioned above, the UEs 115 may be more commonly found within the coverage area of some beam directions, and less commonly found in the coverage areas of other beam directions. Further, the relay node 503 may not be capable of or configured to obtain statistics related to the beam directions most commonly used by the UEs 115. Accordingly, the beam management configuration employed by the relay node 503 may be suboptimal such that the beam management procedure may involve increased latency, less reliable connections, higher power usage, and/or increased interference with other wireless communication devices.

The present disclosure describes schemes, mechanisms, and devices for network controlled adaptive beam management involving one or more relay nodes. In some aspects, a method for relay node management may include the relay node 503 transmitting an indication of its beam management configuration or parameters to a network node. Based on the indicated beam management configuration, the network node or a different network device may determine a mapping or association between SSB instances and/or RACH occasions to one or more beam directions controlled by the relay node 503. Accordingly, the network may obtain statistics indicating the more commonly used beam directions by one or more wireless communication devices within the coverage area of the relay node based on the mapping or association. For example, if a UE commonly uses a first set of RACH occasions associated with a first relay beam direction or beam sub-index, the network may determine that the first relay beam direction is more commonly used than the other relay beam directions. Accordingly, the network may determine or generate an updated beam management configuration based on the obtained statistics and the indicated beam management configuration from the relay node. The network node may transmit an indication of the updated be management configuration to the relay node. The relay node may perform beam based communications and signaling with the wireless communication devices within its coverage area based on the updated beam management configuration provided by the network. The updated beam management configuration may indicate one or more disabled or skipped beam directions and an updated SSB periodicity for the remaining enabled beam directions. In some aspects, the updated periodicity used for the remaining enabled beam directions may be lower than (more frequent than) The SSB periodicity used when all beam directions were enabled. In some aspects, the relay node may continue to transmit SSBs and/or other reference signals in the disabled or skipped beam directions with a larger periodicity than used for the enabled beams. In some aspects, the periodicity used for the disabled or skipped beam directions may be substantially larger or longer than that of the enabled beam directions. The periodicity used for the disabled or skipped beam directions may be semi-statically configured, or hard-coded at the relay node.

Figure 6:
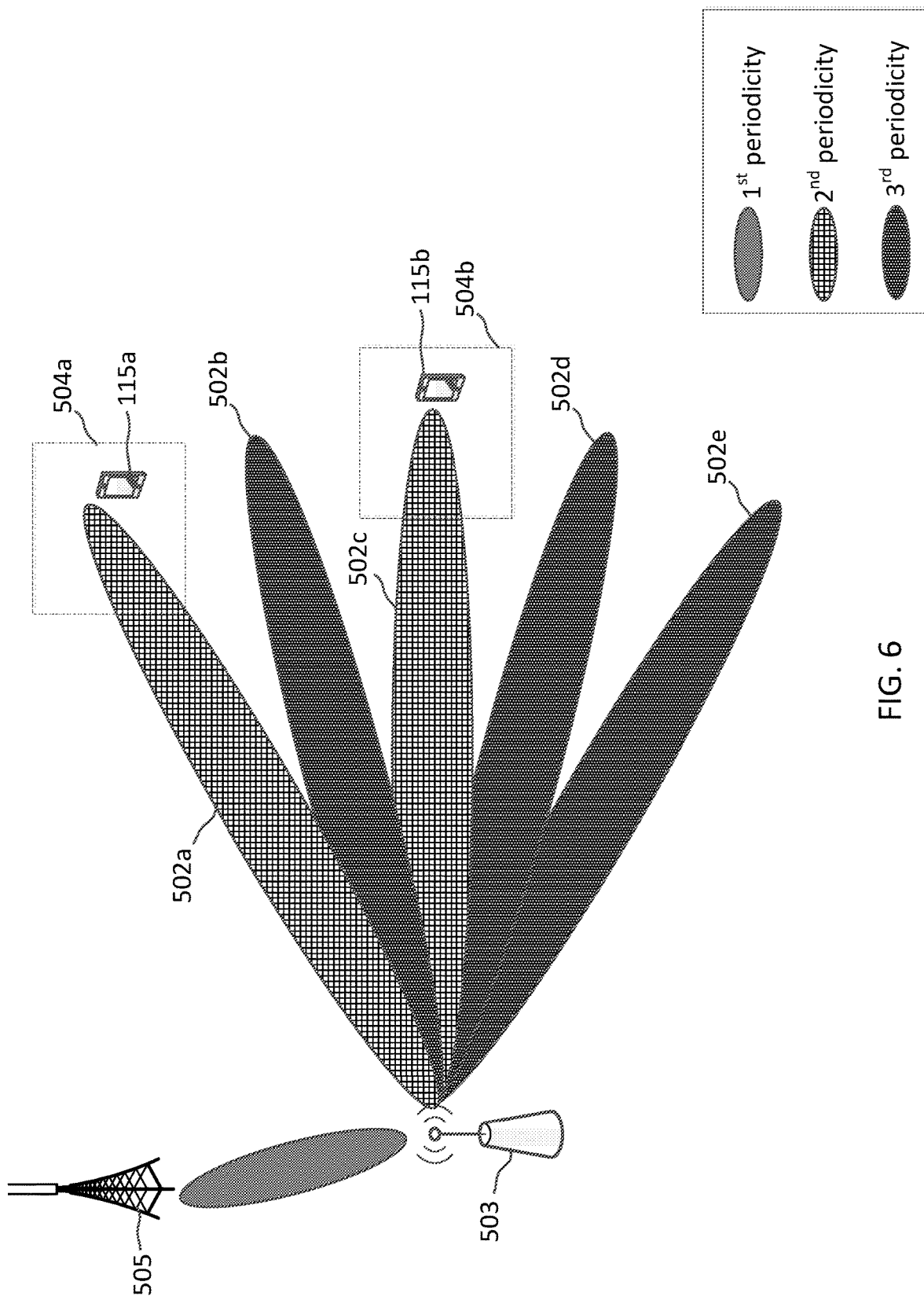
FIG. 6 illustrates a wireless communication scenario in which a network node communicates with one or more UEs via a relay node using an updated beam management configuration.

In this regard, FIG. 6 illustrates a wireless communication scenario 600 in which a network node 505 communicates with one or more UEs 115 via a relay node 503 using an updated beam management configuration. The network node 505 may be a BS, such as one of the BSs 105 in the network 100. The network node 505 may be an aggregated BS or a disaggregated BS. For example, the network node 505 may comprise a distributed unit (DU). In another example, the network node 505 may comprise a centralized unit (CU) and the relay node 503 may comprise a DU.

In some aspects, the relay node 503 may be a smart repeater, a RIS, a relay device, and/or any other suitable type of wireless communication device configured to repeat and/or relay communications between the network node 505 and the UEs 115. In one example, the relay node 503 comprises a smart repeater configured for transparent repeating of communication signals between the network node 505 and the user equipments 115. In this regard, the relay node 503 may be configured to relay or repeat communications without decoding and re-encoding. In other aspects, the relay node 503 may be configured to decode and re encode communications between the network node 505 and the user equipments 115.

In the scenario 600 of FIG. 6, the relay node 503 may be configured to communicate with the UEs 115 using a first subset of beam directions associated with an updated second periodicity. The relay node 503 may also perform reference signal transmissions, signaling, and/or cell selection and connection establishment procedures in a second set of beam directions using a third periodicity. The first subset of beam directions includes the first beam direction 502A and the third beam direction 502C. The second subset of beam directions includes the second beam direction 502B, the 4th beam direction 502D, and the fifth beam direction 502E. However, it will be understood that the subsets illustrated in FIG. 6 are exemplary and that other combinations of beam directions are also within the scope of the present disclosure. In some aspects, the relay node 503 may use the updated second periodicity for a single beam direction 502, and may use the third periodicity for all remaining beam directions 502. In other aspects, the relay node 503 may be configured with a periodicity for each of the plurality of beam directions.

In the illustrated example, the second subset of beam directions associated with the third periodicity may correspond to disabled, skipped, or inactive beam directions as indicated in the updated beam configuration provided by the network. Accordingly, the third periodicity may be significantly longer, or higher, than the updated second periodicity. For example, in some aspects, the first periodicity may be 20 ms. the updated second periodicity may be 40 ms. the third periodicity may be one second, 2 seconds, 3 seconds, 4 seconds, or any other suitable periodicity. In this regard, the second periodicity may be based on the first periodicity, in some aspects. For example, the second periodicity may be a integer multiple of the first periodicity. in one example, the second periodicity may be determined as the first periodicity multiplied by the number of beam directions using the second periodicity. Accordingly, in the example of FIG. 6, if the first periodicity is 10 ms, the updated second periodicity may be 20 ms. In other aspects, the second periodicity may be independent of the first periodicity.

According to the scenario shown in FIG. 6, the relay node 503 may perform SSB or other reference cell transmissions more frequently than would be performed if all of the beam directions 502 were enabled using the same periodicity. Accordingly, the updated beam management configuration shown in FIG. 6 may allow for lower latency and/or more reliable wireless connections between the user equipments 115 and the network node 505. Further, the power consumption of the relay node 503 may be reduced. In this regard, the user equipments 115 may initiate or perform RACH procedures with less delay. In other words, the user equipments 115 may be provided with more frequent RACH occasions in which to transmit a RACH preamble to initiate a connection.

Figure 7:
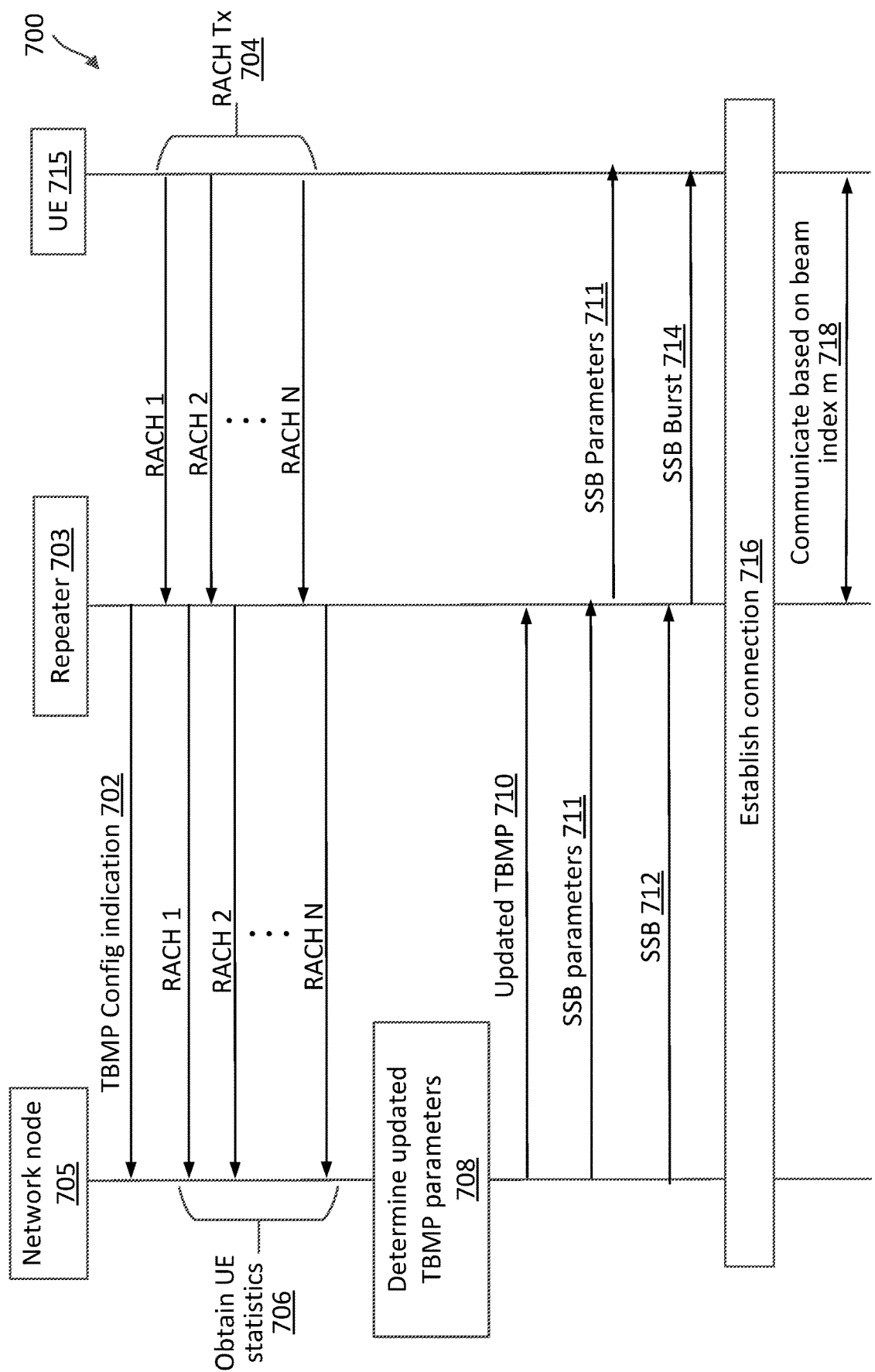
FIG. 7 is a signaling diagram of a method for wireless communication using adaptive beam management configurations according to some aspects of the present disclosure.

FIG. 7 is a signaling diagram of a method 700 for wireless communication according to aspects of the present disclosure. The method 700 may be performed by a network node 705, a relay node 703, and a UE 715. The network node 705 may be a BS, for example. In this regard, the network node 705 may comprise one of the BSs 105 in the network 100. The network node 705 may be an aggregated BS or a disaggregated BS. For example, the network node 705 may be a distributed unit (DU). The relay node 703 may be a smart repeater device or other relay device configured to repeat or relay communications between the network node 705 and the UE 715. The method 700 may include aspects of the scenarios 500, 600 illustrated above in FIGS. 5 and 6.

The method 700 may provide a mechanism for network-controlled adaptive beam management of the relay node 703.

At action 702, the relay node 703 transmits, and the network node 705 receives, a transparent beam management procedure (TBMP) configuration indication. The TBMP configuration indication may be indicated in a Uu communication from the relay node 703 to the BS 705. In some aspects, the TBMP indication may be carried in a RRC configuration, a PUSCH communication, UCI, and/or any other suitable type of communication. The TBMP configuration indication may indicate, for example, a number of beam directions transmitted and/or received by the relay node 703. The TBMP configuration indication may further include or indicate at least one periodicity associated with the beam directions. In some aspects, a same periodicity may be used for all beam directions, as illustrated in FIG. 5. In other aspects, there may be two or more subsets of beams, where each subset is associated with a respective periodicity. In some aspects, the TBMP configuration may indicate one or more disabled or skipped beam directions. Accordingly, the TBMP configuration may include or indicate a first set or subset of beam directions that are enabled and associated with a first periodicity, and a second subset of one or more beam directions that are disabled. In some aspects, the relay node 703 may be configured with a second periodicity for the disabled or skipped beam directions. In another aspect, that TBMP configuration indication may indicate a signal power or signal energy for at least one of the beam directions used by the relay node 703. For example, the TBMP configuration indication may indicate a first signal energy for a first subset of beam directions, and/or a second signal energy for a second subset of beam directions.

At action 704, the UE 715 transmits, and the relay node 703 receives and relays to the network node 705, a plurality of random access communications over a period of time. In some aspects, the random access communications may include random access preambles. The random access preambles may be transmitted in respective random access occasions, or RACH occasions. The RACH occasions may be based on or associated with a SSB periodicity configured by the network via the network node 705. In this regard, the network node 705 may communicate with the relay node 703 based on a SSB periodicity. The SSB periodicity may be, for example, 5 ms, 10 ms, 20 ms, 40 ms, 60 ms, 80 ms, 100 ms, 120 ms, and/or any other suitable periodicity. Further, the RACH occasions may be based on or associated with a beam periodicity of the TBMP configuration used by the relay node 703. In some aspects, the beam periodicity may be equal to or greater than the SSB periodicity used by the network node 705.

At action 706, The network node 705 obtains UE statistics based on the RACH messages transmitted by the UE 715. For example, the network node 705 may obtain statistics related to which RACH occasions the UE 715 uses to transmit random access communications. Further, the network node 705 may be configured to associate or map the random access occasions in which the random access messages are received to one or more of the beam directions used by the relay node 703. The network knows 705 may determine the mapping or association based on the T BMP configuration indication transmitted at action 702. For example, the network nodes 705 may know that a subset of the random access occasions is associated with a first beam direction used by the relay node 703, that a second subset of the random access occasions is associated with a second beam direction used by the relay node 703, that a third subset of random access occasions are associated with a third beam direction used by the relay node 703, etc.

At action 708, the network node 705 determines or generates an updated TBMP configuration based on the statistics obtained at action 706 and the TBMP configuration indication transmitted at action 702. In some aspects, the network node 705 may determine or identify one or more beam directions used by the relay node 703 which one or more of the UEs, including the UE 715, are more likely to use. For example, referring to FIGS. 5 and 6, the UE 715 may be relatively more likely to be found in one of the regions 504 corresponding to the first beam direction 502a and the third beam direction 502c. Accordingly, the updated TBMP configuration may use a lower periodicity (more frequent) for a first subset of beam directions, and a higher periodicity (less frequent) for a second subset of beam directions used by the relay node 703. In another aspect, the updated TBMP configuration may indicate using a first signal energy for the first subset of beam directions and a second signal energy for the second subset of beam directions. For example, that TBMP configuration may indicate a higher signal energy for the beam directions in which the one or more UEs are more commonly found. In some aspects, the updated TBMP configuration may include or indicate a vector of integers representing a period of multiplication from the SSB periodicity used to communicate SSBs from the network node 705 to the relay node 703.

At action 710, the network node 705 transmits the updated TBMP configuration to the relay node 703. In some aspects, transmitting the updated TBMP configuration may comprise transmitting a RRC message indicating the updated TBMP configuration parameters. In some aspects, transmitting the updated TBMP configuration may comprise transmitting a media access control-control element (MAC-CE). However, it will be understood that these examples are not exclusive and that other types of communications may be used to communicate an updated TBMP configuration within the scope of the present disclosure. In some aspects, the updated TBMP configuration may be communicated or signaled periodically, semi-statically, aperiodically, and/or dynamically.

At action 711, the network node 705 transmits, via the relay node 703, a communication indicating one or more SSB parameters to the UE 715. In some aspects, action 711 comprises transmitting a RRC message, DCI, a MAC-CE, a SIB, and/or any other suitable type of message. The one or more SSB parameters may include, for example, an SSB periodicity, an expected time of the SSB transmission, a duration of the SSB, and/or any other suitable parameters for the SSB transmission. In some aspects, the SSB parameters may be indicated per beam. For example, the SSB periodicity may be indicated per relay beam direction. In other aspects, the SSB parameters may be indicated per network node beam direction.

At action 712, the network node 705 transmits, and the relay node 703 receives, a SSB. The SSB may be one of a plurality of SSB communications transmitted by the network node 705 in a SSB burst. For example, the network node 705 may transmit the SSB burst in a sweeping fashion in a plurality of beam directions. The relay node 703 may be located along or otherwise spatially associated with one of the beam directions. In other aspects, the relay node 703 may be spatially associated with two or more of the beams transmitted by the network node 703. The SSB transmitted at action 712 may be transmitted according to a SSB periodicity as explained above.

At action 714, the relay node 703 transmits, based on the SSB received at action 712, a SSB burst to one or more UEs, including the UE 715. The SSB burst may comprise one or more instances of the SSB communication of action 712 transmitted in each of a plurality of relay beam directions based on the updated TBMP configuration transmitted at action 710. For example, transmitting the SSB burst may comprise transmitting SSB communications in each of a plurality of relay beam directions based on the beam direction indications provided in the updated TBMP configuration. Although referred to as a "burst," it will be understood that action 714 may include the relay node 703 transmitting a single instance of a SSB communication in a single beam direction, in some aspects. In other aspects, each relay beam direction may be associated with a sub-index. For example, the SSB transmitted at action 712 may have an index of i, and the relay beam directions may have sub-indices of j, k, l, m, n, etc. Accordingly, the SSB transmissions in each of the relay beam directions may be referred to as SSB occasions or instances of $SSB_i$.

At action 716, the UE 715 and the relay node 703 establish a connection based on the SSB burst. In this regard, the UE 715 may identify a strongest beam direction from the SSB burst. Action 716 may include the UE 715 performing a RACH procedure via the relay node 703.

At action 718, once in connected mode, the UE 715 may communicate with the network node 705 via the relay node 703 using the relay beam direction m selected or established by the UE 715. For example, action 718 may include the UE 715 transmitting UL communications in PUCCH, PUSCH, and/or any other suitable UL channel. In another aspect, action 718 may include the UE 715 receiving, from the network node 705 via the relay node 703, one or more DL communications. For example, action 718 may include the UE 715 receiving, from the relay node 703 via the network node 705, DCI, DL data, reference signals, control information, RRC configuration information, and/or any other suitable type of communication.

Figure 8:
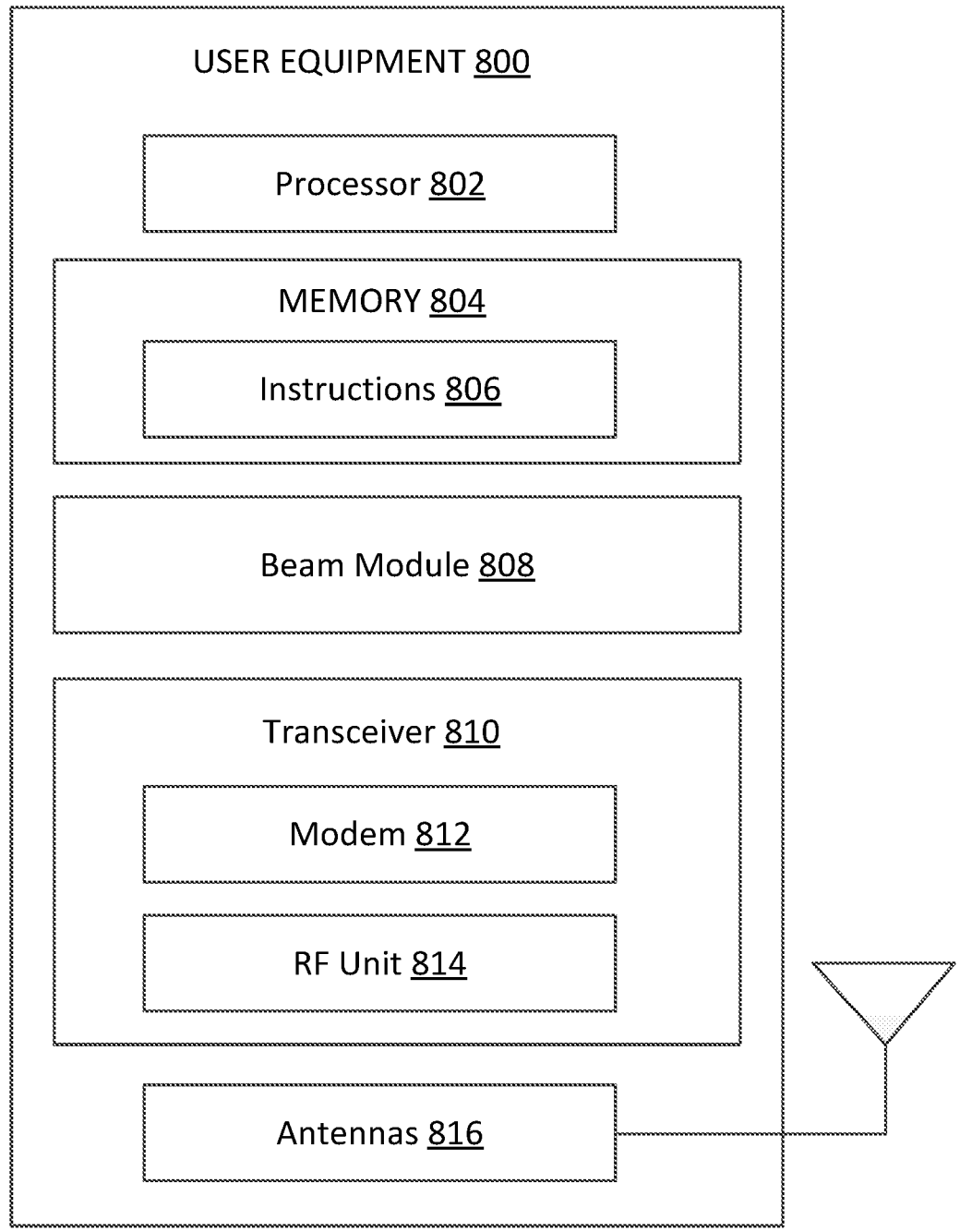
FIG. 8 is a block diagram of a UE according to some aspects of the present disclosure.

FIG. 8 is a block diagram of an exemplary UE 800 according to some aspects of the present disclosure. The UE 800 may be a UE 115 discussed above in FIG. 1A or a node 315 discussed above in FIGS. 3 and 4. As shown, the UE 800 may include a processor 802, a memory 804, a beam module 808, a transceiver 810 including a modem subsystem 812 and a radio frequency (RF) unit 814, and one or more antennas 816. These elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to the UEs 115 in connection with aspects of the present disclosure, for example, aspects of FIGS. 5-7, 11, and 12. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The beam module 808 may be implemented via hardware, software, or combinations thereof. For example, the beam module 808 may be implemented as a processor, circuit, and/or instructions 806 stored in the memory 804 and executed by the processor 802. In some instances, the beam module 808 can be integrated within the modem subsystem 812. For example, the beam module 808 can be implemented by a combination of software components (e.g., executed by a DSP or a general processor) and hardware components (e.g., logic gates and circuitry) within the modem subsystem 812.

The beam module 808 may be used for various aspects of the present disclosure, for example, aspects of aspects of FIGS. 5-7, 11, and 12.

As shown, the transceiver 810 may include the modem subsystem 812 and the RF unit 814. The transceiver 810 can be configured to communicate bi-directionally with other devices, such as the BSs 105. The modem subsystem 812 may be configured to modulate and/or encode the data from the memory 804 and/or the beam module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., PUCCH control information, PRACH signals, PUSCH data, beam management parameters and configurations, reference signals) from the modem subsystem 812 (on outbound transmissions) or of transmissions originating from another source such as a UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 115 to enable the UE 115 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., SSBs, PDCCH, PDSCH, beam switch command, beam management parameters, beam management configurations) to the beam module 808 for processing. The antennas 816 may include multiple antennas of similar or different designs in order to sustain multiple transmission links. The RF unit 814 may configure the antennas 816.

In some aspects, the transceiver 810 is configured to communicate, with a second wireless communication device of a group of wireless communication devices, a communication signal using a first beam characteristic. The transceiver 810 is further configured to receive, from the second wireless communication device, at least one of beam feedback information or a beam change request. The transceiver 810 is further configured to transmit, to the group of wireless communication devices in response to the at least one of the beam feedback information or the beam change request, a beam configuration indicating a second beam characteristic to be used by the group of wireless communication devices for communicating with the first wireless communication device, where the second beam characteristic being different from the first beam characteristic. The transceiver 810 may coordinate with the beam module 808 for communicating the communication signal, receiving the at least one of the beam feedback information or the beam change request, and transmitting the beam configuration.

In an aspect, the UE 800 can include multiple transceivers 810 implementing different RATs (e.g., NR and LTE). In an aspect, the UE 800 can include a single transceiver 810 implementing multiple RATs (e.g., NR and LTE). In an aspect, the transceiver 810 can include various components, where different combinations of components can implement different RATs.

Figure 9:
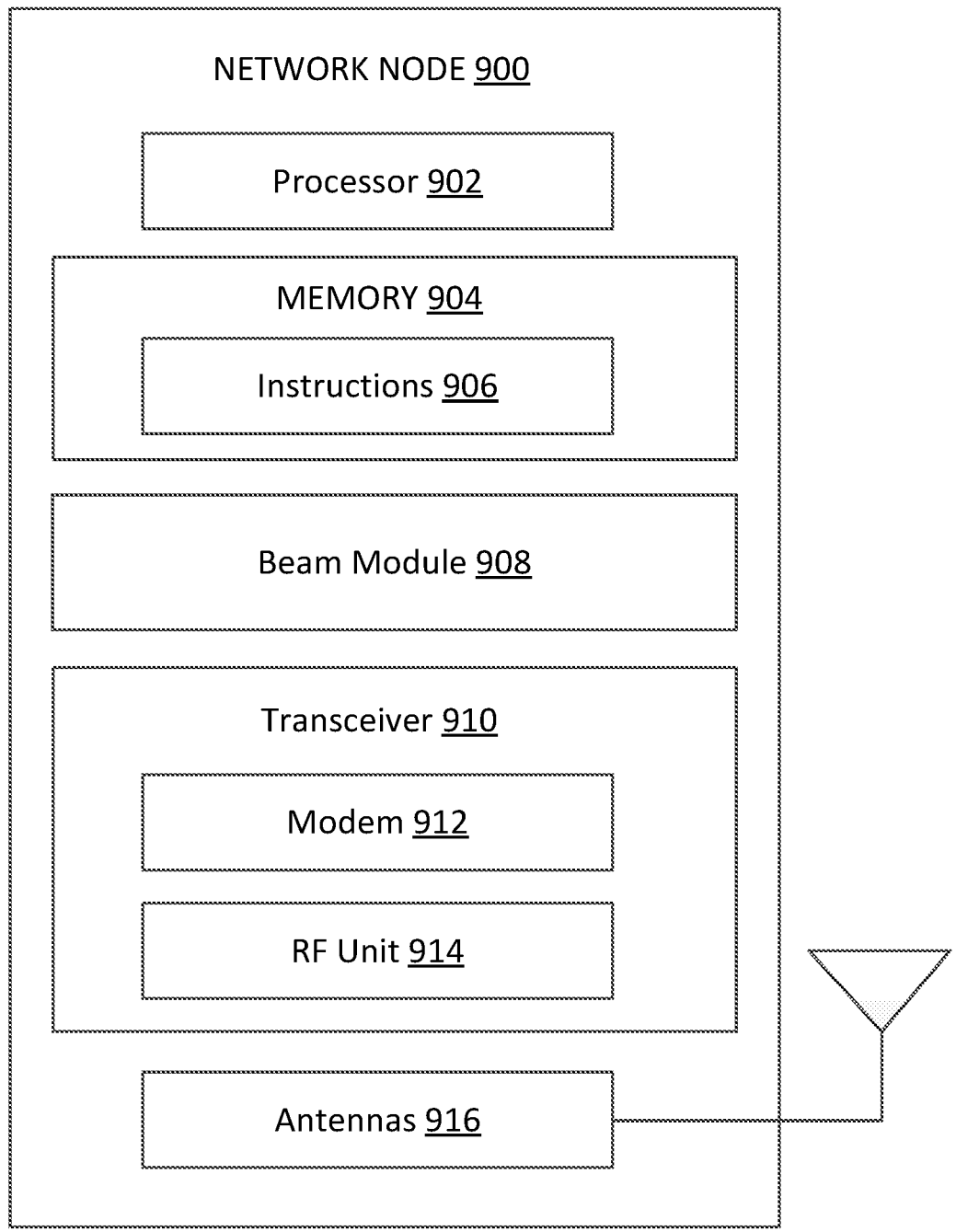
FIG. 9 is a block diagram of an exemplary base station (BS) according to some aspects of the present disclosure.

FIG. 9 is a block diagram of an exemplary network node 900 according to some aspects of the present disclosure. The network node 900 may be a BS 105 in the network 100 as discussed above in FIG. 1A or a node 315 discussed above in FIGS. 3 and 4. A shown, the network node 900 may include a processor 902, a memory 904, a beam module 908, a transceiver 910 including a modem subsystem 912 and a RF unit 914, and one or more antennas 916. These elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 904 may include a non-transitory computer-readable medium. The memory 904 may store instructions 906. The instructions 906 may include instructions that, when executed by the processor 902, cause the processor 902 to perform operations described herein, for example, aspects of FIGS. 5-7, 11, and 12. Instructions 906 may also be referred to as code, which may be interpreted broadly to include any type of computer-readable statement(s) as discussed above with respect to FIG. 8.

The beam module 908 may be implemented via hardware, software, or combinations thereof. For example, the beam module 908 may be implemented as a processor, circuit, and/or instructions 906 stored in the memory 904 and executed by the processor 902. In some instances, the beam module 908 can be integrated within the modem subsystem 912. For example, the beam module 908 can be implemented by a combination of software components (e.g., executed by a DSP or a general processor) and hardware components (e.g., logic gates and circuitry) within the modem subsystem 912.

The beam module 908 may be used for various aspects of the present disclosure, for example, aspects of aspects of FIGS. 5-7, 11, and 12.

As shown, the transceiver 910 may include the modem subsystem 912 and the RF unit 914. The transceiver 910 can be configured to communicate bi-directionally with other devices, such as the UEs 115 and/or 300 and/or another core network element. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., SSBs, RMSI, MIB, SIB, FBE configuration, PRACH configuration PDCCH, PDSCH) from the modem subsystem 912 (on outbound transmissions) or of transmissions originating from another source such as a UE 115, the node 315, and/or UE 800. The RF unit 914 may be further configured to perform analog beamforming in conjunction with the digital beamforming. Although shown as integrated together in transceiver 910, the modem subsystem 912 and/or the RF unit 914 may be separate devices that are coupled together at the BS 105 to enable the BS 105 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may be similar to the antennas 302 of the BS 305 discussed above. This may include, for example, transmission of information to complete attachment to a network and communication with a camped UE 115 or 215 according to some aspects of the present disclosure. The antennas 916 may further receive data messages transmitted from other devices and provide the received data messages for processing and/or demodulation at the transceiver 910. The transceiver 910 may provide the demodulated and decoded data (e.g., PUCCH control information, PRACH signals, PUSCH data) to the beam module 908 for processing. The antennas 916 may include multiple antennas of similar or different designs in order to sustain multiple transmission links.

In an example, the transceiver 910 is configured to transmit, to a UE, system information including an FBE configuration indicating a plurality of frame periods, each including a gap period for contention at the beginning of the frame period, and communicate with the UE based on the FBE configuration, for example, by coordinating with the beam module 908.

In an aspect, the network node 900 can include multiple transceivers 910 implementing different RATs (e.g., NR and LTE). In an aspect, the network node 900 can include a single transceiver 910 implementing multiple RATs (e.g., NR and LTE). In an aspect, the transceiver 910 can include various components, where different combinations of components can implement different RATs.

Figure 10:
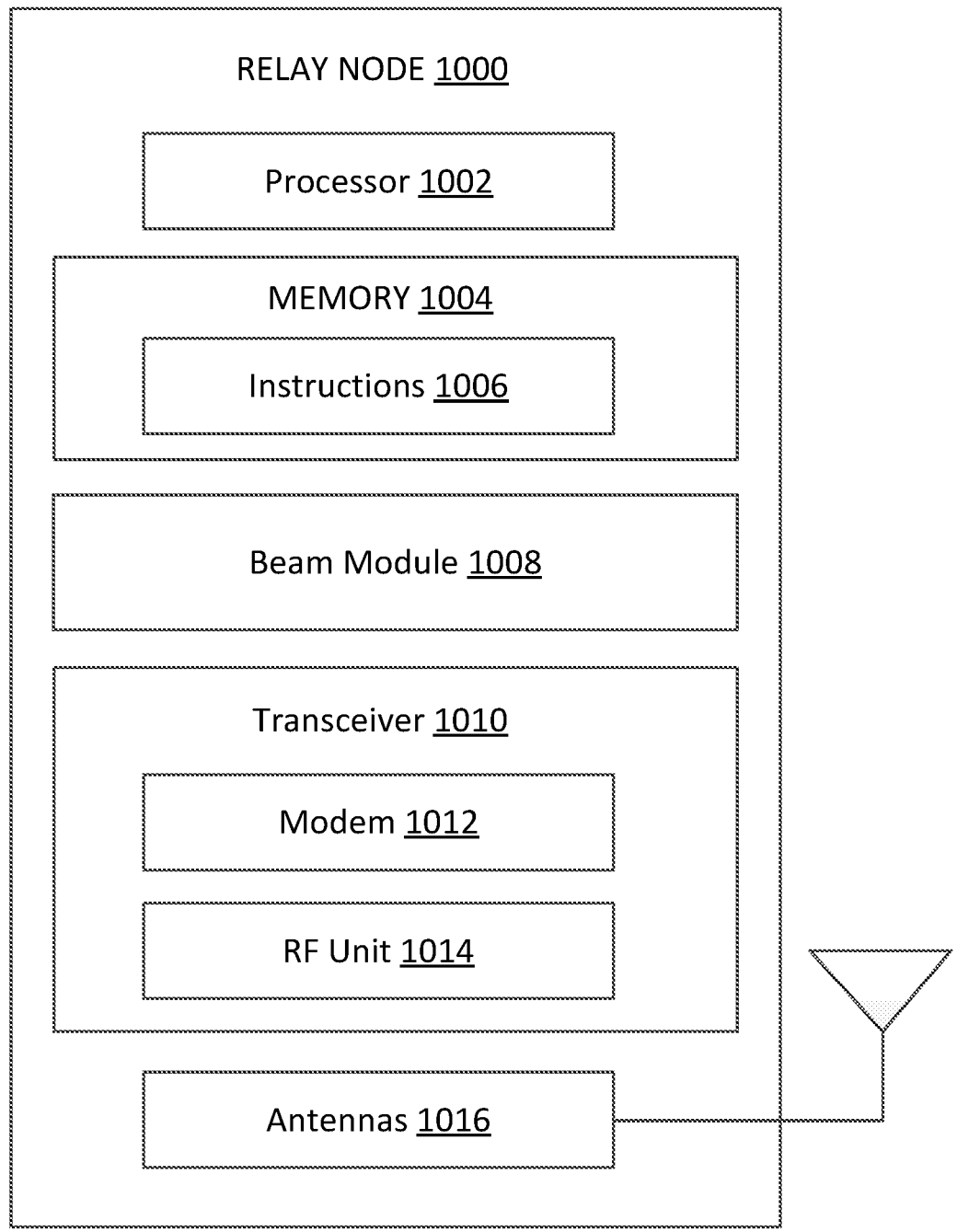
FIG. 10 is a block diagram of an exemplary relay node according to some aspects of the present disclosure.

FIG. 10 is a block diagram of an exemplary relay node 1000 according to some aspects of the present disclosure. The relay node 1000 may be a BS 105 in the network 100 as discussed above in FIG. 1A or a node 315 discussed above in FIGS. 3 and 4. A shown, the relay node 1000 may include a processor 1002, a memory 1004, a beam module 1008, a transceiver 1010 including a modem subsystem 1012 and a RF unit 1014, and one or more antennas 1016. These elements may be in direct or indirect communication with each other, for example via one or more buses.

The processor 1002 may have various features as a specific-type processor. For example, these may include a CPU, a DSP, an ASIC, a controller, a FPGA device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1004 may include a non-transitory computer-readable medium. The memory 1004 may store instructions 1006. The instructions 1006 may include instructions that, when executed by the processor 1002, cause the processor 1002 to perform operations described herein, for example, aspects of FIGS. 5-7, 11, and 12. Instructions 1006 may also be referred to as code, which may be interpreted broadly to include any type of computer-readable statement(s) as discussed above with respect to FIG. 8.

The beam module 1008 may be implemented via hardware, software, or combinations thereof. For example, the beam module 1008 may be implemented as a processor, circuit, and/or instructions 1006 stored in the memory 1004 and executed by the processor 1002. In some instances, the beam module 1008 can be integrated within the modem subsystem 1012. For example, the beam module 1008 can be implemented by a combination of software components (e.g., executed by a DSP or a general processor) and hardware components (e.g., logic gates and circuitry) within the modem subsystem 1012.

The beam module 1008 may be used for various aspects of the present disclosure, for example, aspects of aspects of FIGS. 5-7, 11, and 12.

As shown, the transceiver 1010 may include the modem subsystem 1012 and the RF unit 1014. The transceiver 1010 can be configured to communicate bi-directionally with other devices, such as the UEs 115 and/or 300 and/or another core network element. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., SSBs, RMSI, MIB, SIB, FBE configuration, PRACH configuration PDCCH, PDSCH) from the modem subsystem 1012 (on outbound transmissions) or of transmissions originating from another source such as a UE 115, the node 315, and/or UE 800. The RF unit 1014 may be further configured to perform analog beamforming in conjunction with the digital beamforming. Although shown as integrated together in transceiver 1010, the modem subsystem 1012 and/or the RF unit 1014 may be separate devices that are coupled together at the BS 105 to enable the BS 105 to communicate with other devices.

The RF unit 1014 may provide the modulated and/or processed data, e.g. data packets (or, more generally, data messages that may contain one or more data packets and other information), to the antennas 1016 for transmission to one or more other devices. The antennas 1016 may be similar to the antennas 302 of the BS 305 discussed above. This may include, for example, transmission of information to complete attachment to a network and communication with a camped UE 115 or 215 according to some aspects of the present disclosure. The antennas 1016 may further receive data messages transmitted from other devices and provide the received data messages for processing and/or demodulation at the transceiver 1010. The transceiver 1010 may provide the demodulated and decoded data (e.g., PUCCH control information, PRACH signals, PUSCH data) to the beam module 1008 for processing. The antennas 1016 may include multiple antennas of similar or different designs in order to sustain multiple transmission links.

In an example, the transceiver 1010 is configured to transmit, to a UE, system information including an FBE configuration indicating a plurality of frame periods, each including a gap period for contention at the beginning of the frame period, and communicate with the UE based on the FBE configuration, for example, by coordinating with the beam module 1008.

In an aspect, the relay node 1000 can include multiple transceivers 1010 implementing different RATs (e.g., NR and LTE). In an aspect, the relay node 1000 can include a single transceiver 1010 implementing multiple RATs (e.g., NR and LTE). In an aspect, the transceiver 1010 can include various components, where different combinations of components can implement different RATs.

Figure 11:
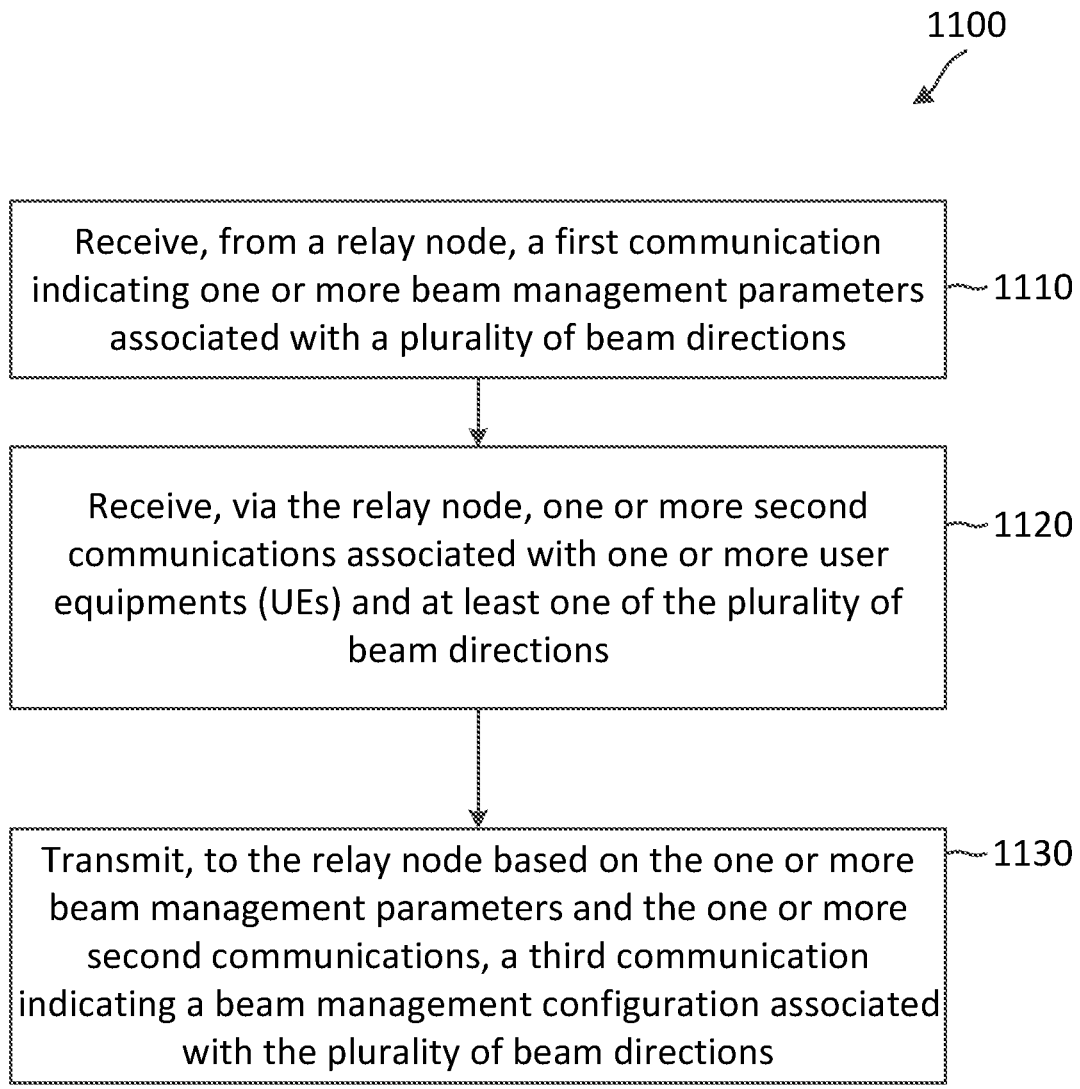
FIG. 11 is a flow diagram of a wireless communication method according to some aspects of the present disclosure.

FIG. 11 is a flow diagram of a communication method 1100 according to some aspects of the present disclosure. Steps of the method 1100 can be executed by a computing device (e.g., a processor, processing circuit, and/or other suitable component) of an apparatus or other suitable means for performing the steps. For example, a BS, such as the BSs 105, the BS 305, the network node 505, and/or the network node 900 may utilize one or more components, such as the processor 902, the memory 904, the beam module 908, the transceiver 910, and the one or more antennas 916, to execute the steps of method 1100. The method 1100 may employ similar mechanisms as in the methods 700 and/or 800 described above with respect to FIGS. 6 and/or 7. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, a network node receives, from a relay node, a first communication indicating one or more beam management parameters associated with a plurality of beam directions. In some aspects, the plurality of beam directions may be relay beam directions. The relay node may include a smart relay device, a RIS, and/or any other suitable wireless communication device configured to repeat and/or relay communications between a UE and the network node. In some aspects, the first communication may comprise a RRC configuration message, UCI, and/or any other suitable type of communication indicating the beam management parameters. In some aspects, the beam management parameters may be associated with a transparent beam management procedure (TBMP). The beam management parameters may include, for example, a number of available or enabled beam directions, an index and/or sub index for each of the beam directions, at least one periodicity of the plurality of beam directions, a signal power or signal energy for one or more of the plurality of beam directions, and/or any other suitable beam management parameter. In some aspects, the beam management configuration parameters may include or indicate one or more enabled beams and one or more disabled or inactive beams. The beam management parameters may further include a periodicity for each of the plurality of beam directions.

At block 1120, the network node receives, via the relay node, one or more second communications associated with one or more UEs and at least one of the plurality of beam directions. For example, block 1120 may include the network node receiving, via the relay node, a plurality of random access messages or preambles from the UE. The one or more second communications may be received in one or more RACH occasions. In some aspects, the network node may be capable associating or mapping the RACH occasions in which the second communications are received to one or more of the plurality of beam directions. Accordingly, the network node or another network device may obtain statistics regarding the preferred or optimal beam directions of the relay node used by the one or more UEs. As explained above, in some aspects, the one or more UEs may be more commonly found in some regions within the beam coverage of the relay node that are associated with a first subset of the beam directions, and less likely to be found in other regions associated with a second subset of the beam directions. For example, the network node or another network device may generate a histogram or table of the beam directions used by the relay node for communicating with the UE.

At block 1130, the network node transmits, to the relay node based on the one or more beam management parameters and the one or more second communications, a third communication indicating a beam management configuration associated with the plurality of beam directions. In some aspects, the beam management configuration comprises an updated TBMP configuration. For example, the beam management configuration may include or indicate an updated periodicity for at least a subset of the plurality of beam directions.

Figure 12:
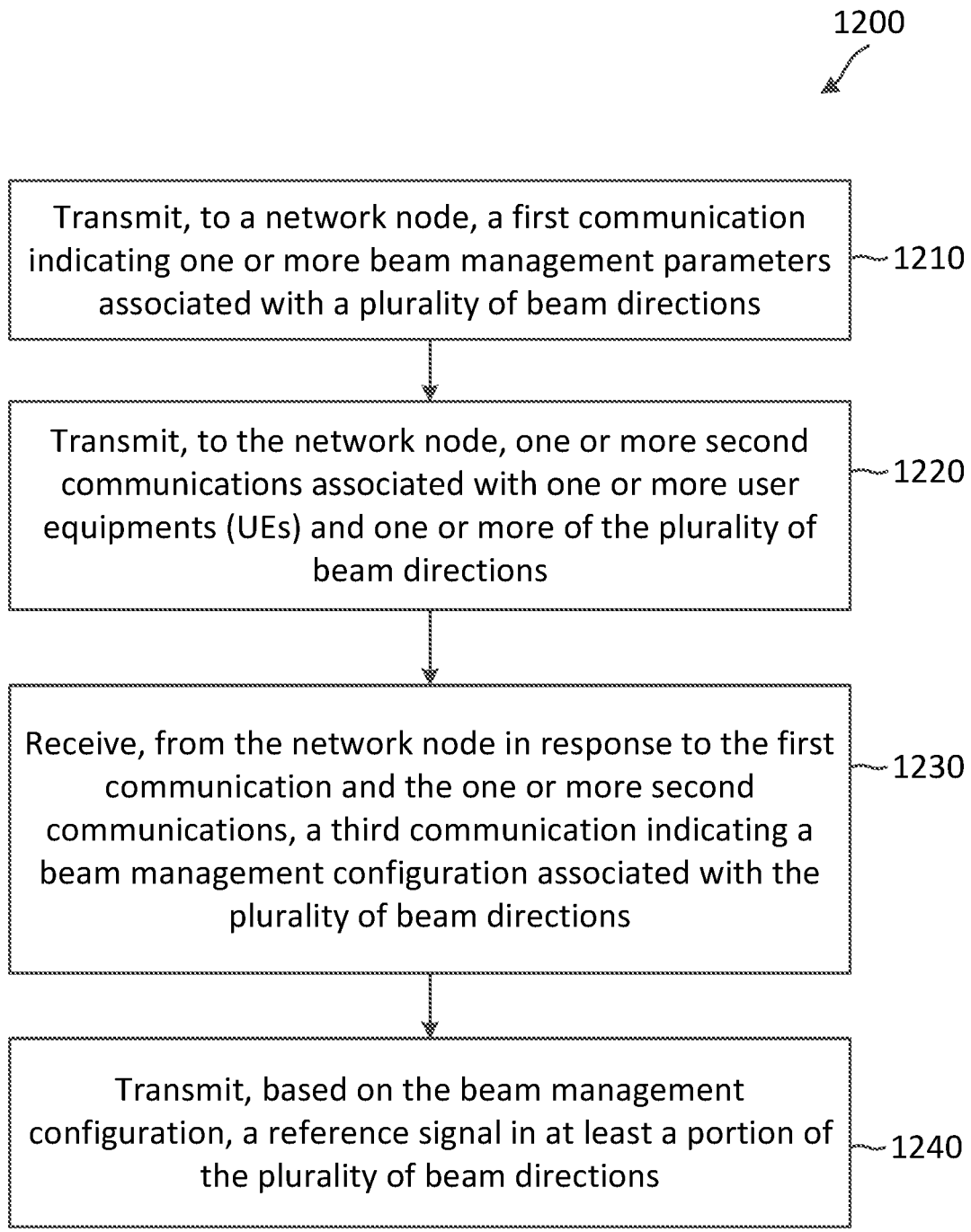
FIG. 12 is a flow diagram of a wireless communication method according to some aspects of the present disclosure.

FIG. 12 is a flow diagram of a communication method 1200 according to some aspects of the present disclosure. Steps of the method 1200 can be executed by a computing device (e.g., a processor, processing circuit, and/or other suitable component) of an apparatus or other suitable means for performing the steps. For example, a relay node, such as the repeater 303, the relay node 503, and/or the relay node 1000, may utilize one or more components, such as the processor 1002, the memory 1004, the beam module 1008, the transceiver 1010, and the one or more antennas 1016, to execute the steps of method 1200. The method 1200 may employ similar mechanisms as in the methods 700 and/or 800 described above with respect to FIGS. 6 and/or 7. As illustrated, the method 1200 includes a number of enumerated steps, but aspects of the method 1200 may include additional steps before, after, and in between the enumerated steps. In some aspects, one or more of the enumerated steps may be omitted or performed in a different order.

At block 1210, the relay node transmits, to a network node, a first communication indicating one or more beam management parameters associated with a plurality of beam directions. In some aspects, the plurality of beam directions may be relay beam directions. The relay node may include a smart relay device, a RIS, and/or any other suitable wireless communication device configured to repeat and/or relay communications between a UE and the network node. In some aspects, the first communication may comprise a RRC configuration message, UCI, and/or any other suitable type of communication indicating the beam management parameters. In some aspects, the beam management parameters may be associated with a transparent beam management procedure (TBMP). The beam management parameters may include, for example, a number of available or enabled beam directions, an index and/or sub index for each of the beam directions, at least one periodicity of the plurality of beam directions, a signal power or signal energy for one or more of the plurality of beam directions, and/or any other suitable beam management parameter. In some aspects, the beam management configuration parameters may include or indicate one or more enabled beams and one or more disabled or inactive beams. The beam management parameters may further include a periodicity for each of the plurality of beam directions.

At block 1220, the relay node transmits, to the network node, one or more second communications associated with one or more UEs and one or more of the plurality of beam directions. For example, block 1220 may include the relay node transmitting or relaying a plurality of random access messages or preambles received from the UE. The one or more second communications may be received in one or more RACH occasions. In some aspects, the network node may be capable associating or mapping the RACH occasions in which the second communications are received to one or more of the plurality of beam directions. Accordingly, the network node or another network device may obtain statistics regarding the preferred or optimal beam directions of the relay node used by the one or more UEs. As explained above, in some aspects, the one or more UEs may be more commonly found in some regions within the beam coverage of the relay node that are associated with a first subset of the beam directions, and less likely to be found in other regions associated with a second subset of the beam directions. For example, the network node or another network device may generate a histogram or table of the beam directions used by the relay node for communicating with the UE.

At block 1230, the relay node receives, from the network node in response to the first communication and the one or more second communications, a third communication indicating a beam management configuration associated with the plurality of beam directions. In some aspects, the beam management configuration comprises an updated TBMP configuration. For example, the beam management configuration may include or indicate an updated periodicity for at least a subset of the plurality of beam directions.

At block 1240, the relay node transmits, based on the beam management configuration, a reference signal in at least a portion of the plurality of beam directions. In some aspects, transmitting the reference signal comprises transmitting a SSB in at least the portion of the plurality of beam directions. The relay node may transmit a SSB burst including a plurality of instances of the SSB in each beam direction of the portion of the plurality of beam directions. In some aspects, the first periodicity is based on the third periodicity and a number of beam directions in the first set of one or more beam directions. In some aspects, the beam management configuration indicates that a first set of one or more beam directions of the plurality of beam directions is disabled and that a second set of one or more beam directions of the plurality of beam directions is enabled.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

EXEMPLARY ASPECTS OF THE DISCLOSURE

Aspect 1. A method of wireless communication performed by a network node, the method comprising: receiving, from a relay node, a first communication indicating one or more beam management parameters associated with a plurality of beam directions; receiving, via the relay node, one or more second communications associated with one or more user equipments (UEs) and at least one of the plurality of beam directions; and transmitting, to the relay node based on the one or more beam management parameters and the one or more second communications, a third communication indicating a beam management configuration associated with the plurality of beam directions.

Aspect 2. The method of aspect 1, wherein the beam management configuration indicates: a first periodicity for a first set of one or more beam directions of the plurality of beam directions; and a second periodicity for a second set of one or more beam directions of the plurality of beam directions, wherein the second periodicity is different from the first periodicity.

Aspect 3. The method of aspect 2, wherein the receiving the one or more second communications comprises receiving the one or more second communications based on a third periodicity different from at least one of the first periodicity or the second periodicity.

Aspect 4. The method of aspect 3, wherein the first periodicity is based on the third periodicity and a number of beam directions in the first set of one or more beam directions.

Aspect 5. The method of any of aspects 1-4, wherein the beam management configuration indicates: a first energy parameter for a first set of one or more beam directions of the plurality of beam directions; and a second energy parameter for a second set of one or more beam directions of the plurality of beam directions, wherein the second energy parameter is different from the first energy parameter.

Aspect 6. The method of any of aspects 1-5, wherein the receiving the one or more second communications comprises receiving the one or more second communications in one or more random access occasions, wherein the beam management configuration is based on a mapping of the one or more random access occasions to the at least one of the plurality of beam directions.

Aspect 7. The method of any of aspects 1-6, wherein the one or more beam management parameters comprise: a number of beam directions of the plurality of beam directions; and at least one periodicity associated with the plurality of beam directions.

Aspect 8. A method of wireless communication performed by a relay node, the method comprising: transmitting, to a network node, a first communication indicating one or more beam management parameters associated with a plurality of beam directions; transmitting, to the network node, one or more second communications associated with one or more user equipments (UEs) and one or more of the plurality of beam directions; receiving, from the network node in response to the first communication and the one or more second communications, a third communication indicating a beam management configuration associated with the plurality of beam directions; and transmitting, based on the beam management configuration, a reference signal in at least a portion of the plurality of beam directions.

Aspect 9. The method of aspect 8, wherein the beam management configuration indicates: a first periodicity for a first set of one or more beam directions of the plurality of beam directions; and a second periodicity for a second set of one or more beam directions of the plurality of beam directions, wherein the second periodicity is different from the first periodicity.

Aspect 10. The method of aspect 9, wherein the transmitting the one or more second communications comprises transmitting the one or more second communications based on a third periodicity different from at least one of the first periodicity or the second periodicity.

Aspect 11. The method of aspect 10, wherein the first periodicity is based on the third periodicity and a number of beam directions in the first set of one or more beam directions.

Aspect 12. The method of any of aspects 8-11, wherein the beam management configuration indicates: a first energy parameter for a first set of one or more beam directions of the plurality of beam directions; and a second energy parameter for a second set of one or more beam directions of the plurality of beam directions, wherein the second energy parameter is different from the first energy parameter.

Aspect 13. The method of any of aspects 8-12, wherein the transmitting the one or more second communications comprises transmitting the one or more second communications in one or more random access occasions.

Aspect 14. The method of any of aspects 8-13, wherein the one or more beam management parameters comprise: a number of beam directions of the plurality of beam directions; and at least one periodicity associated with the plurality of beam directions.

Aspect 15. The method of any of aspects 8-14, wherein the beam management configuration indicates that a first set of one or more beam directions of the plurality of beam directions is disabled and that a second set of one or more beam directions of the plurality of beam directions is enabled.

Aspect 16. A network node comprising: a memory device; a transceiver; and a processor in communication with the memory device and the transceiver, wherein the network node is configured to perform the steps of any of aspects 1-7.

Aspect 17. A relay node comprising: a memory device; a transceiver; and a processor in communication with the memory device and the transceiver, wherein the relay node is configured to perform the steps of any of aspects 8-15.

Aspect 18. A non-transitory, computer-readable medium having program code recorded thereon, wherein the program code comprises instructions executable by a processor of a network node to cause the network node to perform the steps of any of aspects 1-7.

Aspect 19. A non-transitory, computer-readable medium having program code recorded thereon, wherein the program code comprises instructions executable by a processor of a relay node to cause the network node to perform the steps of any of aspects 8-15.

Aspect 20. A network node comprising means for performing the steps of any of aspects 1-7.

Aspect 21. A relay node comprising means for performing the steps of any of aspects 8-15.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a network node, the method comprising:
    receiving, from a relay node, a first communication indicating one or more beam management parameters associated with a plurality of beam directions, wherein the one or more beam management parameters comprise at least one of:
        a configured periodicity used by the relay node for a beam management procedure; or
        a configured number of beam directions used by the relay node for the beam management procedure;
    receiving, via the relay node, one or more second communications associated with one or more user equipments (UEs) and at least one of the plurality of beam directions; and
    transmitting, to the relay node based on the one or more beam management parameters and the one or more second communications, a third communication indicating a beam management configuration for use by the relay node in the beam management procedure, wherein the beam management configuration is associated with the plurality of beam directions.

2. The method of claim 1, wherein the beam management configuration indicates:
    a first periodicity for a first set of one or more beam directions of the plurality of beam directions; and
    a second periodicity for a second set of one or more beam directions of the plurality of beam directions, wherein the second periodicity is different from the first periodicity.

3. The method of claim 2, wherein the receiving the one or more second communications comprises receiving the one or more second communications based on a third periodicity different from at least one of the first periodicity or the second periodicity.

4. The method of claim 3, wherein the first periodicity is based on the third periodicity and a number of beam directions in the first set of one or more beam directions.

5. The method of claim 1, wherein the beam management configuration indicates:
    a first energy parameter for a first set of one or more beam directions of the plurality of beam directions; and
    a second energy parameter for a second set of one or more beam directions of the plurality of beam directions, wherein the second energy parameter is different from the first energy parameter.

6. The method of claim 1, wherein the receiving the one or more second communications comprises receiving the one or more second communications in one or more random access occasions, wherein the beam management configuration is based on a mapping of the one or more random access occasions to the at least one of the plurality of beam directions.

7. The method of claim 1, wherein the one or more beam management parameters comprise:
    a number of beam directions of the plurality of beam directions; and
    at least one periodicity associated with the plurality of beam directions.

8. A method of wireless communication performed by a relay node, the method comprising:
    transmitting, to a network node, a first communication indicating one or more beam management parameters associated with a plurality of beam directions, wherein the one or more beam management parameters comprise at least one of:
        a configured periodicity used by the relay node for a beam management procedure; or
        a configured number of beam directions used by the relay node for the beam management procedure;
    transmitting, to the network node, one or more second communications associated with one or more user equipments (UEs) and one or more of the plurality of beam directions;
    receiving, from the network node in response to the first communication and the one or more second communications, a third communication indicating a beam management configuration associated with the plurality of beam directions; and
    transmitting, based on the beam management configuration, a reference signal in at least a portion of the plurality of beam directions.

9. The method of claim 8, wherein the beam management configuration indicates:
    a first periodicity for a first set of one or more beam directions of the plurality of beam directions; and a second periodicity for a second set of one or more beam directions of the plurality of beam directions, wherein the second periodicity is different from the first periodicity.

10. The method of claim 9, wherein the transmitting the one or more second communications comprises transmitting the one or more second communications based on a third periodicity different from at least one of the first periodicity or the second periodicity.

11. The method of claim 10, wherein the first periodicity is based on the third periodicity and a number of beam directions in the first set of one or more beam directions.

12. The method of claim 8, wherein the beam management configuration indicates:
a first energy parameter for a first set of one or more beam directions of the plurality of beam directions; and
a second energy parameter for a second set of one or more beam directions of the plurality of beam directions, wherein the second energy parameter is different from the first energy parameter.

13. The method of claim 8, wherein the transmitting the one or more second communications comprises transmitting the one or more second communications in one or more random access occasions.

14. The method of claim 8, wherein the one or more beam management parameters comprise:
a number of beam directions of the plurality of beam directions; and
at least one periodicity associated with the plurality of beam directions.

15. The method of claim 8, wherein the beam management configuration indicates that a first set of one or more beam directions of the plurality of beam directions is disabled and that a second set of one or more beam directions of the plurality of beam directions is enabled.

16. A network node, comprising:
a memory device;
a transceiver; and
a processor in communication with the memory device and the transceiver, wherein the network node is configured to:
receive, from a relay node, a first communication indicating one or more beam management parameters associated with a plurality of beam directions, wherein the one or more beam management parameters comprise at least one of:
a configured periodicity used by the relay node for a beam management procedure; or
a configured number of beam directions used by the relay node for the beam management procedure;
receive, via the relay node, one or more second communications associated with one or more user equipments (UEs) and at least one of the plurality of beam directions; and
transmit, to the relay node based on the one or more beam management parameters and the one or more second communications, a third communication indicating a beam management configuration for use by the relay node in the beam management procedure, wherein the beam management configuration is associated with the plurality of beam directions.

17. The network node of claim 16, wherein the beam management configuration indicates:
a first periodicity for a first set of one or more beam directions of the plurality of beam directions; and
a second periodicity for a second set of one or more beam directions of the plurality of beam directions, wherein the second periodicity is different from the first periodicity.

18. The network node of claim 17, wherein the network node is configured to receive the one or more second communications based on a third periodicity different from at least one of the first periodicity or the second periodicity.

19. The network node of claim 18, wherein the first periodicity is based on the third periodicity and a number of beam directions in the first set of one or more beam directions.

20. The network node of claim 16, wherein the beam management configuration indicates:
a first energy parameter for a first set of one or more beam directions of the plurality of beam directions; and
a second energy parameter for a second set of one or more beam directions of the plurality of beam directions, wherein the second energy parameter is different from the first energy parameter.

21. The network node of claim 16, wherein the network node is configured to receive the one or more second communications in one or more random access occasions, wherein the beam management configuration is based on a mapping of the one or more random access occasions to the at least one of the plurality of beam directions.

22. The network node of claim 16, wherein the one or more beam management parameters comprise:
a number of beam directions of the plurality of beam directions; and
at least one periodicity associated with the plurality of beam directions.

23. A relay node, comprising:
a memory device;
a transceiver; and
a processor in communication with the memory device and the transceiver, wherein the relay node is configured to:
transmit, to a network node, a first communication indicating one or more beam management parameters associated with a plurality of beam directions, wherein the one or more beam management parameters comprise at least one of:
a configured periodicity used by the relay node for a beam management procedure; or
a configured number of beam directions used by the relay node for the beam management procedure;
transmit, to the network node, one or more second communications associated with one or more user equipments (UEs) and one or more of the plurality of beam directions;
receive, from the network node in response to the first communication and the one or more second communications, a third communication indicating a beam management configuration associated with the plurality of beam directions; and
transmit, based on the beam management configuration, a reference signal in at least a portion of the plurality of beam directions.

24. The relay node of claim 23, wherein the beam management configuration indicates:
a first periodicity for a first set of one or more beam directions of the plurality of beam directions; and
a second periodicity for a second set of one or more beam directions of the plurality of beam directions, wherein the second periodicity is different from the first periodicity.

25. The relay node of claim 24, wherein the relay node is configured to transmit the one or more second communications based on a third periodicity different from at least one of the first periodicity or the second periodicity.

26. The relay node of claim 25, wherein the first periodicity is based on the third periodicity and a number of beam directions in the first set of one or more beam directions.

27. The relay node of claim 23, wherein the beam management configuration indicates:
   a first energy parameter for a first set of one or more beam directions of the plurality of beam directions; and
   a second energy parameter for a second set of one or more beam directions of the plurality of beam directions, wherein the second energy parameter is different from the first energy parameter.

28. The relay node of claim 23, wherein the relay node is configured to transmit the one or more second communications in one or more random access occasions.

29. The relay node of claim 23, wherein the one or more beam management parameters comprise:
   a number of beam directions of the plurality of beam directions; and
   at least one periodicity associated with the plurality of beam directions.

30. The relay node of claim 23, wherein the beam management configuration indicates that a first set of one or more beam directions of the plurality of beam directions is disabled and that a second set of one or more beam directions of the plurality of beam directions is enabled.

* * * * *